(12) United States Patent
Kato et al.

(10) Patent No.: US 8,611,679 B2
(45) Date of Patent: Dec. 17, 2013

(54) IMAGE PROCESSING DEVICE AND IMAGE PROCESSING METHOD

(75) Inventors: Yutaka Kato, Fukuchiyama (JP); Koji Shimada, Ayabe (JP)

(73) Assignee: Omron Corporation, Kyoto (JP)

( * ) Notice: Subject to any disclaimer, the term of this patent is extended or adjusted under 35 U.S.C. 154(b) by 924 days.

(21) Appl. No.: 12/712,913

(22) Filed: Feb. 25, 2010

(65) Prior Publication Data

US 2010/0232707 A1 Sep. 16, 2010

(30) Foreign Application Priority Data

Mar. 13, 2009 (JP) .................................. 2009-061066

(51) Int. Cl.
*G06K 9/36* (2006.01)

(52) U.S. Cl.
USPC ............ 382/232; 382/242; 382/243; 382/238

(58) Field of Classification Search
None
See application file for complete search history.

(56) References Cited

U.S. PATENT DOCUMENTS

| | | | |
|---|---|---|---|
| 4,961,231 A | 10/1990 | Nakayama et al. | |
| 5,621,825 A | 4/1997 | Masaki et al. | |
| 6,895,104 B2 * | 5/2005 | Wendt et al. .................. | 382/125 |
| 2007/0280547 A1 * | 12/2007 | Mitsui ........................... | 382/253 |

FOREIGN PATENT DOCUMENTS

| | | |
|---|---|---|
| EP | 0 228 322 A1 | 7/1987 |
| JP | 2002-230549 A | 8/2002 |
| WO | WO 93/18471 A1 | 9/1993 |

OTHER PUBLICATIONS

Jacobus, C., et al.; Intermediate-Level Vision-Building Vertex-String-Surface (V-S-S) Graphs; Computer Graphics and Image Processing vol. 15, No. 4; Apr. 1981; pp. 339-363; Academic Press, Inc.
Baruch, Orit, et al.; Segmentation of Two-dimensional Boundaries Using the Chain Code; Pattern Recognition, vol. 21, No. 6; 1988; pp. 581-589; Pergamon Press plc, Great Britain.
European Patent Office extended search report on application 10154035.9 dated Oct. 21, 2013; 8 pages.

* cited by examiner

*Primary Examiner* — Jason M Repko
*Assistant Examiner* — David Perlman
(74) *Attorney, Agent, or Firm* — Foley & Lardner LLP

(57) ABSTRACT

This invention provides an image processing device and an image processing method capable of implementing pattern matching based on an edge code at relatively high speed with a smaller circuit configuration. In the image processing device according to the present embodiment, an information amount of a valid zone is diffused over an entire edge code image. In other words, the amount of information used in the entire edge code image is compressed by reducing the number of bits to assign to each pixel and effectively using the number of bits assigned to each pixel as a whole. If a valid zone for an edge EDG1, the following invalid zone in which the invalid edge code value continues, and the following valid zone for an edge EDG2 appear in a profile of the edge code value, increase/decrease information from the edge code value contained in the valid zone for the edge EDG1 to the edge code value contained in the valid zone for the edge EDG2 is assigned to the element corresponding to the invalid zone.

9 Claims, 19 Drawing Sheets

INPUT IMAGE

EDGE CODE (EC) IMAGE

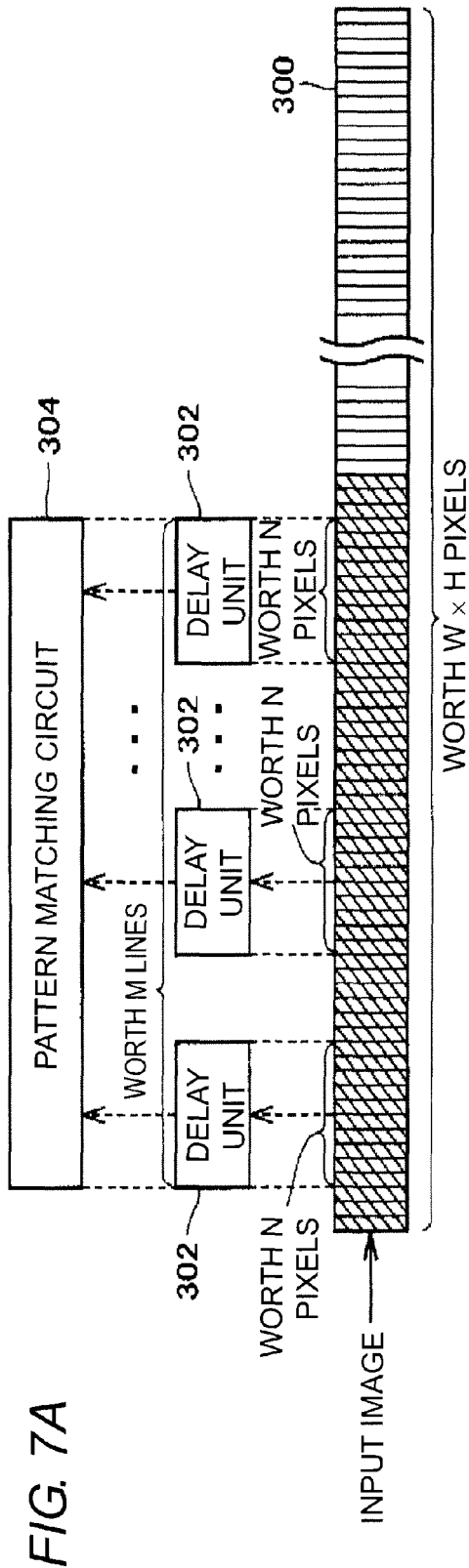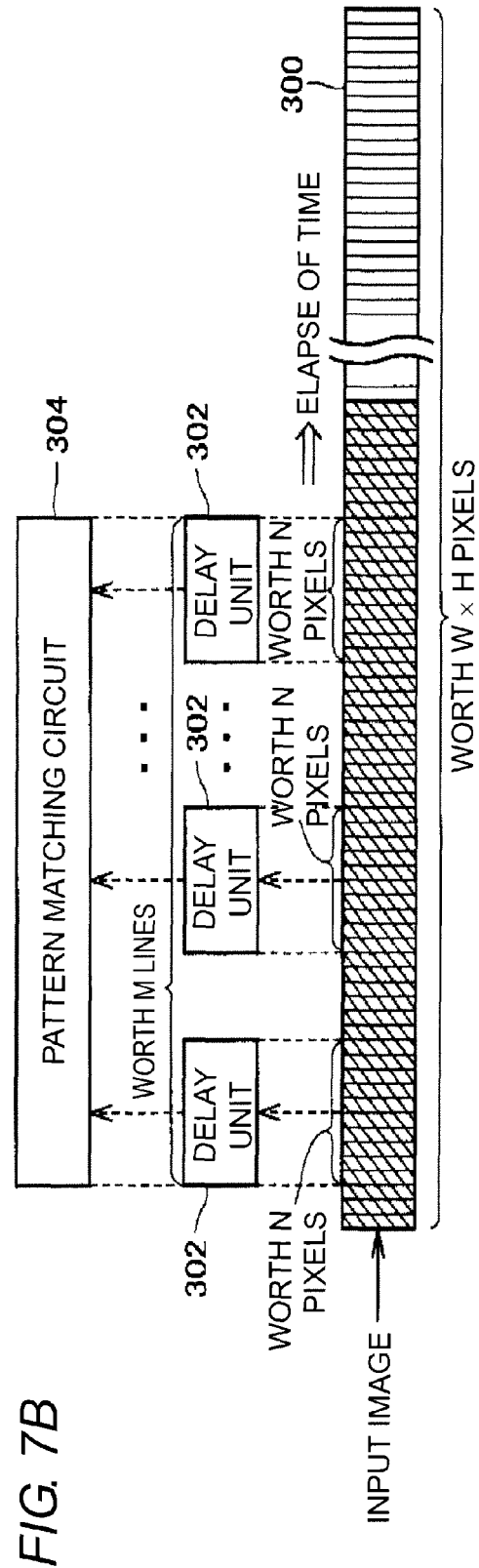

|  | X0 | X1 | X2 | ... |  | X(n-1) |
|---|---|---|---|---|---|---|
| L0 | (0,0,8) | (0,0,8) | (1,7,6) P1 | (0,0,0) | (0,0,0) | (0,0,0) |
| L1 | (0,0,8) | (0,0,8) | (1,7,4) | (0,0,8) | (1,52,8) | (0,0,0) |
|  |  |  | P2 |  | P3 |  |
| ⋮ |  |  |  |  |  |  |
| L(m-1) |  |  |  |  |  |  |

FIG. 18B (VALID/INVALID FLAG, EC VALUE, NUMBER OF DELAYS)

0: INVALID    0 -63    1 -8
1: VALID

IMAGE PROCESSING DEVICE AND IMAGE PROCESSING METHOD

This application is based on Japanese Patent Application No. 2009-061066 filed with the Japan Patent Office on Mar. 13, 2009, the entire content of which is hereby incorporated by reference.

BACKGROUND OF THE INVENTION

1. Technical Field

The present invention relates to an image processing device and an image processing method for performing pattern matching process and the like.

2. Related Art

Conventionally, in a field of FA (Factory Automation) and the like, pattern matching process based on a standard pattern (hereinafter also referred to as "model image") registered in advance is used on an input image obtained by imaging a target (hereinafter also referred to as "target work"). Defects such as scratches and dust that appear on the target work can be detected, and a portion on the target work similar to the model image can be searched through the pattern matching process.

In such a pattern matching process, a window needs to be set in the input image obtained by imaging the target work, and a partial image (image information) in the window and the model image registered in advance need to be compared. The image information of each pixel (typically, gray value of 8 bits) is sequentially outputted from the imaging device along a predetermined scanning direction. In other words, the image information of the pixels contained in the set window is outputted not at the same timing, but in time-series with a delay time.

Thus, a buffer memory of a predetermined amount (typically, worth one screen) is prepared, and the image information from the imaging device is sequentially stored in the buffer memory and the pattern matching process is executed on the stored image information to resolve such a temporal shift. The image processing device for performing the pattern matching process thus has problems in that the circuit configuration enlarges and becomes complicating.

With respect to such a problem, International Publication No. WO93/18471 pamphlet discloses an image processing device, and the like capable of miniaturizing the hardware. In such an image processing device, the input image data represented by a first predetermined number of bits per one pixel is stored in a line memory after being converted to pseudo-halftone image data represented by a second predetermined number of bits less than the first predetermined number of bits. The hardware thus can be miniaturized.

As a new method of the pattern matching process, extracting a portion where change in gray value (brightness) is found in the input image (hereinafter also referred to as "edge (portion)", and performing pattern matching based on a value indicating the changing direction of the edge (hereinafter also referred to as "edge code" or "EC (Edge Code)") is disclosed (e.g., Japanese Unexamined Patent Publication No. 2002-230549). The portion similar to the model image then can be accurately searched by using the edge code even if influence at the time of imaging of the input image is present (e.g., appearing of shade and illumination variation).

The image processing device disclosed in International Publication No. WO93/18471 pamphlet is configured to perform the pattern matching process based on the gray value of the input image, and is not to perform the pattern matching based on the edge code. The circuit configuration thus enlarges and becomes complicating when performing the pattern matching based on the edge code. The processing time also becomes long compared to the hardware when implemented with the software process using a processor.

SUMMARY

The present invention has been devised to solve the problems described above, and an object thereof is to provide an image processing device and an image processing method capable of implementing pattern matching based on an edge code at relatively high speed with a smaller circuit configuration.

In accordance with one aspect of the present invention, an image processing device according to the present invention includes a generation unit for generating an edge code image based on a gray value of an input image. Each element contained in the edge code image includes an edge code value and information indicating valid/invalid of the edge code value. The image processing device further includes a compression unit for compressing the edge code image by assigning information representing the edge code value for an element having a valid edge code value to an element having an invalid edge code value, a storage unit for sequentially storing the compressed edge code image; a decompression unit for decompressing the compressed edge code image stored in the storage unit; and a comparator for calculating a similarity degree between the edge code image decompressed by the decompression unit and a model image defined in advance.

The generation unit is preferably inputted with the gray value of each pixel contained in the input image in a predetermined order; the generation unit sequentially generates the edge code value for every input of the gray value; and the compression unit outputs information for specifying the valid edge code value in correspondence to an element, which is generated before an element having a valid edge code value and which has an invalid edge code value.

When a first zone in which the valid edge code value continues, a second zone, following the first zone, in which the invalid edge code value continues, and a third zone, following the second zone, in which the valid edge code value continues appear in a profile of the sequentially outputted edge code value, the compression unit preferably outputs increase/decrease information from the edge code value contained in the first zone to the edge code value contained in the third zone in correspondence with an element corresponding to the second zone.

The compression unit preferably includes a plurality of first delay elements, connected in series, sequentially inputted with the edge code values generated by the generation unit at a predetermined cycle, a plurality of second delay elements, connected in series, sequentially inputted with the information indicating valid/invalid of the edge code value generated by the generation unit at the predetermined cycle, a position specifying unit for specifying a position of the second delay element storing information indicating valid of the information indicating valid/invalid of the edge code value held in the plurality of second delay elements, an extracting unit for extracting the edge code value held in the first delay element corresponding to the position specified by the position specifying unit of the edge code values held in the plurality of first delay elements, and a difference calculation unit for sequentially outputting a difference between the edge code value extracted by the extracting unit in a previous cycle and the edge code value extracted by the extracting unit in a current cycle as the increase/decrease information.

More preferably, the decompression unit includes an integrating portion for integrating the sequentially outputted increase/decrease information.

More preferably, the decompression unit includes a plurality of third delay elements, connected in series, sequentially inputted with the edge code value held at a predetermined position of the storage unit at the predetermined cycle, and a selection unit for outputting, to the integrating portion, the edge code value held in the delay element corresponding to relative positional information contained in the model image of the plurality of third delay elements.

More preferably, the model image includes an edge code value at an evaluation position for calculating the similarity degree, and the relative positional information indicating a difference in a relative position between the evaluation position and another evaluation position.

The generation unit preferably includes a detector for detecting an edge intensity at each pixel of the input image, and a determination unit for outputting information indicating that the corresponding edge code value is valid when the edge intensity detected by the detector exceeds a predetermined value.

In accordance with another aspect of the present invention, an image processing method according to the present invention includes the steps of generating an edge code image based on a gray value of an input image. Each element contained in the edge code image including an edge code value and information indicating valid/invalid of the edge code value. The image processing method further includes the steps of compressing the edge code image by assigning information representing the edge code value for an element having a valid edge code value to an element having an invalid edge code value; sequentially storing the compressed edge code image; decompressing the stored compressed edge code image; and calculating a similarity degree between the decompressed edge code image and a model image defined in advance.

According to the present invention, the pattern matching based on the edge code can be executed with a smaller circuit configuration and at a relatively high speed.

BRIEF DESCRIPTION OF THE DRAWINGS

FIGS. 7A and 7B are fundamental diagrams describing an outline of an operation in the image processing device according to the embodiment of the present invention;

FIGS. 18A and 18B are views showing one example of a data structure held by a model holding unit shown in FIG. 10;

FIG. 19 is a view schematically showing an angle indicating an edge code value shown in FIGS. 18A and 18B;

DETAILED DESCRIPTION

Figure 1:
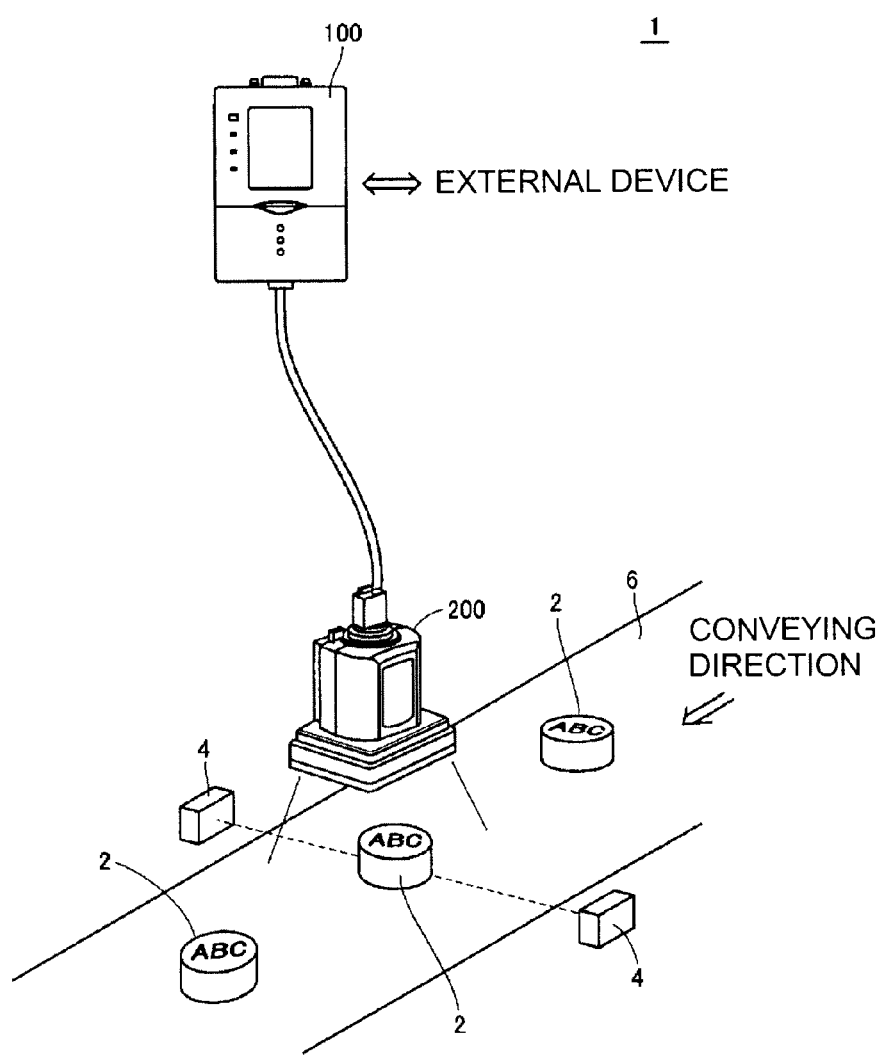
FIG. 1 is a schematic view showing an overall configuration of a pattern matching processing system 1 according to a first embodiment of the present invention.

Hereinafter, preferred embodiments of the present invention will be described with reference to the drawings. The description on the same or corresponding portions throughout the figures will not be repeated by denoting the same reference numerals.

(Overall Configuration)

FIG. 1 is a schematic view showing an overall configuration of a pattern matching processing system 1 according to a first embodiment of the present invention. With reference to FIG. 1, the pattern matching processing system 1 includes an image processing device 100 and an imaging device 200. The pattern matching processing system 1 is representatively incorporated in a production line and the like, and executes pattern matching process based on a model image registered in advance ("edge code image" is used as hereinafter described) with respect to a target work 2.

In the pattern matching processing system 1, the target work 2 is conveyed by a conveying mechanism 6 such as a belt conveyor, and the conveyed target work 2 is imaged by the imaging device 200 at a predetermined timing. An image (hereinafter also referred to as "input image") obtained through imaging by the imaging device 200 is outputted to the image processing device 100. The image processing device 100 executes the pattern matching process on the input image received from the imaging device 200, and displays the result on a mounted display unit or outputs a result to an external device.

(Pattern Matching Process Based on Edge Code)

Figure 2A:
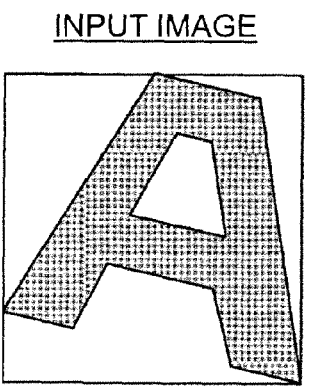
FIGS. 2A and 2B are views describing an outline of a pattern matching process based on an edge code according to the embodiment of the present invention.
Figure 2B:
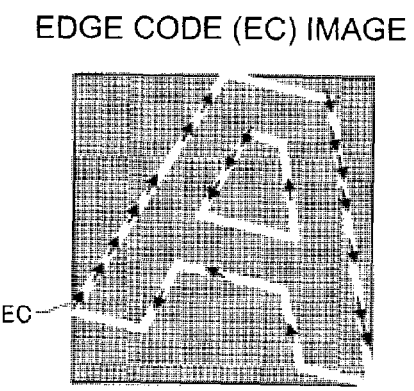

FIGS. 2A and 2B are views describing an outline of the pattern matching process based on an edge code according to the embodiment of the present invention. FIG. 2A shows one example of the input image, and FIG. 2B shows one example in which an edge code image obtained from the input image shown in FIG. 2A is visualized.

In FIG. 2A, a region showing an alphabet "A" exists on a substantially even background. When an edge extraction process is performed on the input image shown in FIG. 2A, a portion corresponding to a contour of the alphabet "A" (white region in FIG. 2B) as shown in FIG. 2B is extracted as a portion of high edge intensity. A value indicating a changing direction of the extracted edge is calculated as an edge code value (EC value) at the relevant edge position. In the present embodiment, a direction in which the edge exists (i.e., direction (angle) of arrow shown in FIG. 2B) is calculated as the edge code as one example of the value indicating the changing direction of the edge.

Figure 3:
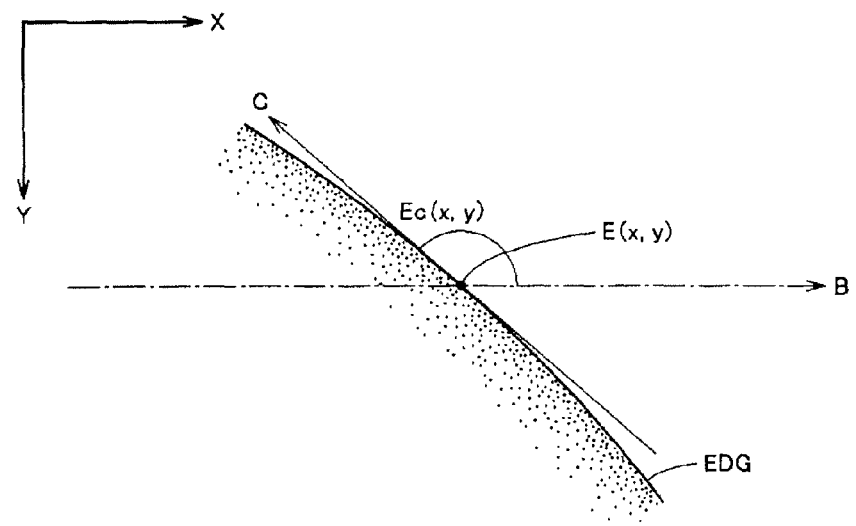
FIG. 3 is a view describing a calculation procedure of the edge code according to the embodiment of the present invention.

FIG. 3 is a view describing a calculation procedure of the edge code according to the present embodiment. A case in which scanning is performed in a B direction to perform the edge extraction process on the image as shown in FIG. 3 will be considered. In the edge extraction process, an edge intensity is detected based on a gray value of the relevant pixel and a gray value of the surrounding pixels, and a maximum value in the profile of the edge intensity with respect to the B direction is extracted as the edge for each pixel existing in the B direction.

In the case shown in FIG. 3, a coordinate E(x, y) is extracted as one part of an edge EDG. In which direction the edge EDG continues is then determined based on the gray value of the surrounding pixel of the extracted coordinate E(x, y), and the like. In other words, a tangent line vector C at the coordinate E(x, y) of the edge EDG is calculated. An angle Ec(x, y) formed by the tangent vector C and a reference vector (B direction in the example shown in FIG. 3) is calculated as an edge code. The angle Ec(x, y) may be defined with 0° to 360° as an effective range, or may be defined with 0° to 180° as an effective range. In the latter case, it becomes a relative angular difference of the tangent line vector C and the reference vector.

As an alternative method, a changing direction of a shading in the extracted edge may be calculated as an edge code. In this case, a direction orthogonal to the tangent line vector C shown in FIG. 3 becomes the edge code.

As described above, a combination of a position of each point extracted as the edge and magnitude of the corresponding edge code is also referred to as "edge code image" or "EC image". In other words, each element configuring the edge code image includes an edge code value corresponded to each coordinate of the input image. Furthermore, each element configuring the edge code image further includes information indicating valid/invalid of the valid edge code value (typically, "valid/invalid flag" described later). In other words, since the edge is not detected at all coordinates, the value of the valid/invalid flag corresponded to the coordinate, at which the edge extraction is attempted, is set to a value indicating that the valid edge code is not extracted to add the information "not valid edge code value" in such a case.

In the image processing device 100 according to the present embodiment, the edge code image is created and registered in advance for the model image used in the pattern matching process. The edge code image for the registered model and the edge code image generated from the input image are compared to calculate a similarity degree thereof. A portion most similar to the model image is searched based on the calculated similarity degree.

The model image for a partial image smaller than the entire size of the input image is used in the pattern matching process. In other words, a window having a size corresponding to the model image registered in advance is sequentially set on the input image, the position of the partial image having the highest degree of similarly with the model image of the partial images in each sequentially set window is searched, and the position obtained by such a search is outputted as a result.

Figure 4:
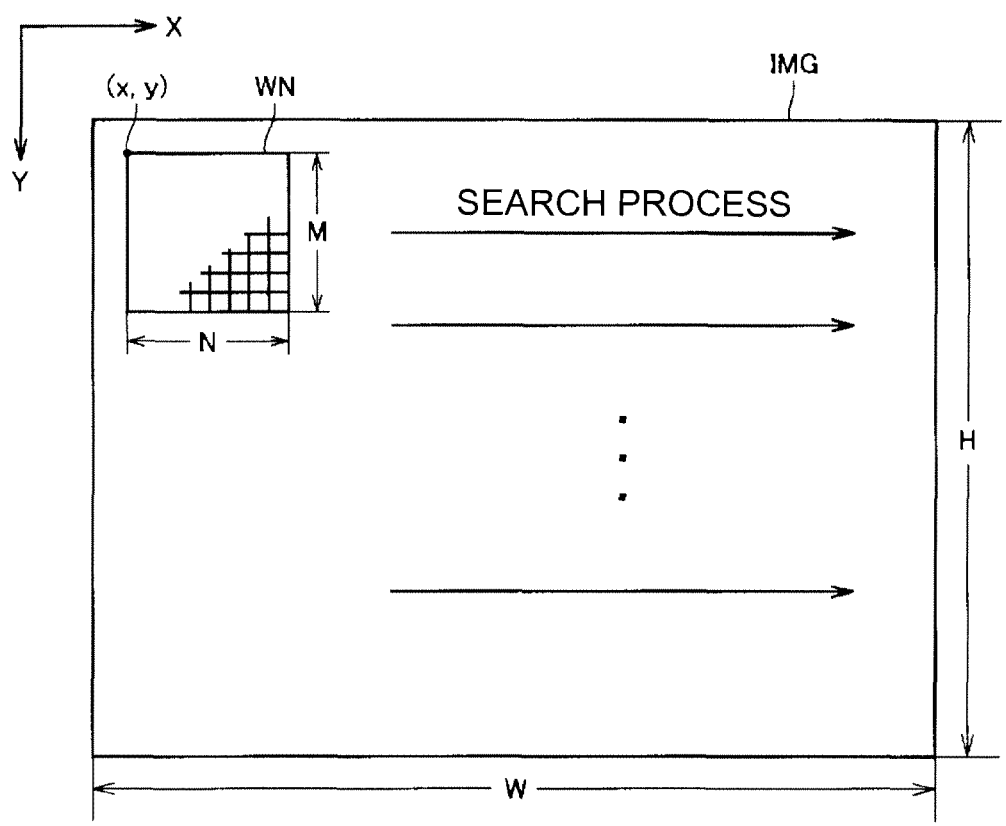
FIG. 4 is a view describing an outline of the pattern matching process (search process) according to the embodiment of the present invention.

FIG. 4 is a view describing an outline of the pattern matching process (search process) according to the embodiment of the present invention. With reference to FIG. 4, an input image IMG acquired through imaging by the imaging device 200 is two-dimensionally arranged in an X-direction and a Y-direction orthogonal to each other. The input image IMG has a size of H pixels×W pixels. A window WN corresponding to the size of the model image registered in advance is sequentially set along a predetermined direction of the input image IMG, and the pattern matching process is sequentially executed on the partial image contained in each set window WN. The window WN is typically set in a range of M pixels×N pixels, with a coordinate of a vertex closest to the origin as (x, y).

The position (region) most similar to the model image is specified in the input image IMG by executing the search process using such a window WN.

(Output Process of Input Image)

An image signal indicating the input image is sequentially outputted in time-series along a predetermined scanning direction from the imaging device 200. The output of the image signal will be described with reference to FIGS. 5 and 6.

Figure 5:
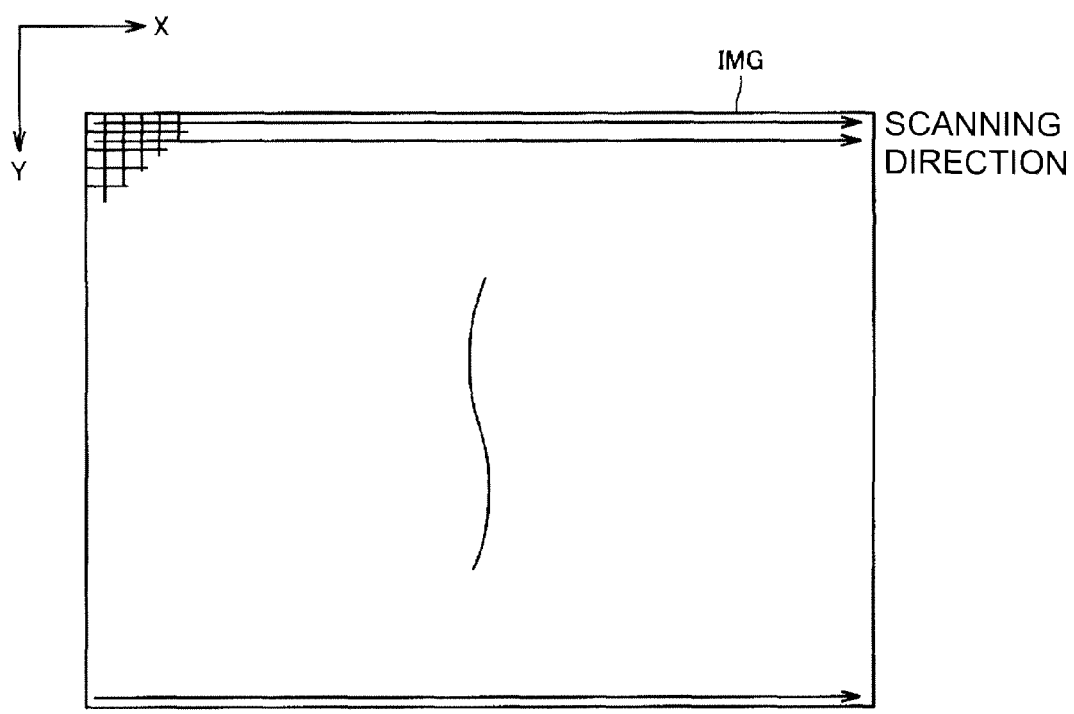
FIG. 5 is a view showing an order of input images outputted from an imaging device according to the embodiment of the present invention.
Figure 6:
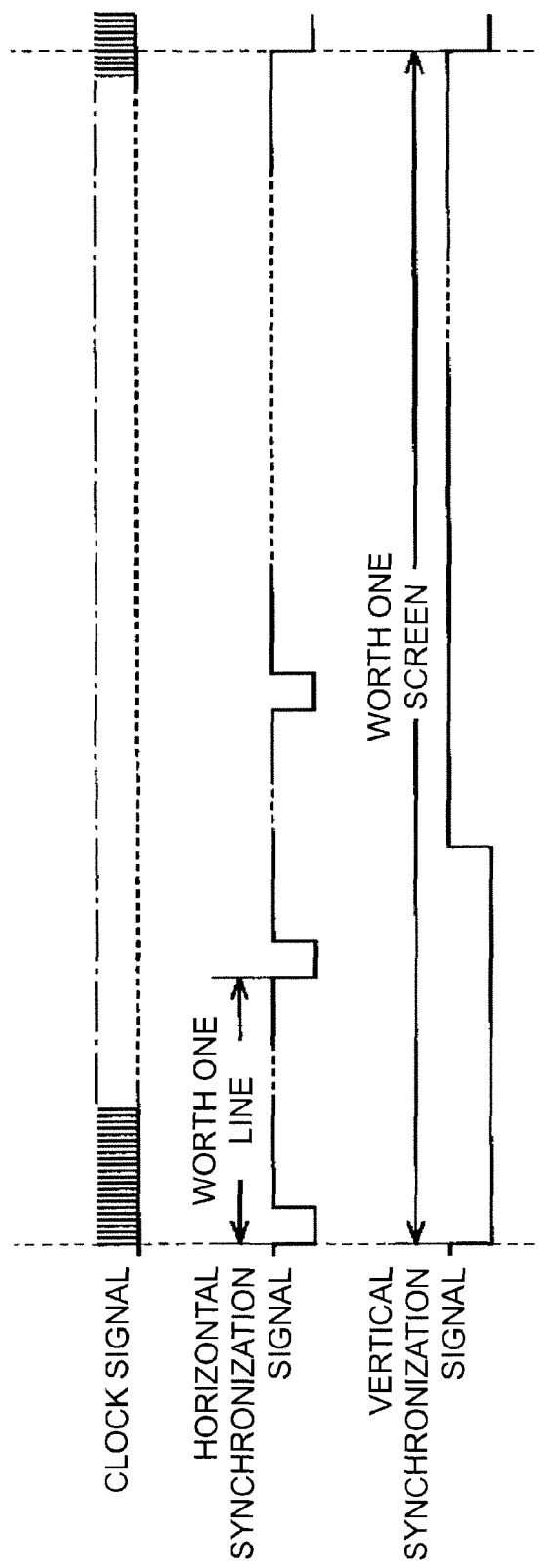
FIG. 6 is a view showing a timing signal used in the output of the input image from the imaging device according to the embodiment of the present invention.

FIG. 5 is a view showing an order of input images outputted from the imaging device 200 according to the embodiment of the present invention. FIG. 6 is a view showing a timing signal used in the output of the input image from the imaging device 200 according to the embodiment of the present invention.

With reference to FIG. 5, the imaging device 200 typically sequentially outputs pixel information (gray value) representing each pixel of the input image IMG by combining horizontal scanning (scanning in the X-direction) and vertical scanning (scanning in the Y-direction). In other words, the imaging device 200 first outputs pixel information in which a first line of the input image IMG is horizontally scanned. The imaging device 200 then outputs pixel information in which a second line is horizontally scanned. The horizontal scanning is similarly repeated hereinafter for lines adjacent in a vertical direction. When performing interlace (interlaced scanning), the horizontal scanning is performed for every other line (or plurality of lines).

With reference to FIG. 6, the output (readout) of the pixel information is performed in synchronization with a clock signal CL. In other words, the pixel information worth one pixel contained in the input image is outputted in correspondence with the clock signal CL for one cycle.

A horizontal synchronization signal HD is outputted from the imaging device 200 to control the horizontal scanning described above. The length of one cycle of the horizontal synchronization signal HD corresponds to a period in which a period for performing the horizontal scanning for one line of the input image IMG and a preparation period for performing the horizontal scanning of the next line (hereinafter also referred to as "horizontal blank period") are combined. The horizontal blank period corresponds to a "horizontal fly-back period" in a television signal. In the example shown in FIG. 6, the horizontal scanning of the corresponding line starts at the timing the horizontal synchronization signal HD changes from "Hi" to "Lo". In other words, the horizontal synchronization signal HD changes from "Hi" to "Lo" by the number of lines contained in the input image in a period of outputting the input images for one screen.

When the horizontal scanning with respect to all the lines is completed, the output of the input images for one screen is completed. In this case, the start position of the horizontal scanning needs to be returned to the first line. Thus, a vertical synchronization signal VD is outputted from the imaging device 200 in addition to the horizontal synchronization signal HD to control the vertical scanning as described above. In the example shown in FIG. 6, the horizontal scanning of the first line starts and the input of a new input image starts at the timing the vertical synchronization signal VD changes from "Hi" to "Lo". In other words, the vertical synchronization signal VD changes from "Hi" to "Lo" only once in a period of outputting the input images for one screen.

(Outline of Processing Operation)

The processing operation in the image processing device 100 according to the present embodiment will now be described with reference to FIGS. 7A and 7B. The image processing device 100 according to the present embodiment operates so that the time required for the pattern matching process with respect to one input image is substantially equal to the time required for the input of one input image from the imaging device 200 to the image processing device 100. Such a process is also referred to as "real time process". In other words, the pattern matching process in the window set at a certain position is synchronously executed every time the image information of one pixel contained in one input image is inputted to the image processing device 100.

FIGS. 7A and 7B are fundamental diagrams describing the outline of the operation in the image processing device 100 according to the embodiment of the present invention. With reference to FIGS. 7A and 7B, the image processing device includes a line buffer 300 for sequentially storing the image information of each pixel provided from the imaging device 200 in FIFO (First In First Out). M delay units 302 are arranged in correspondence to a predetermined position of the line buffer 300. Each delay unit 302 calculates the edge code with respect to N continuing pixels at the predetermined position of the line buffer 300. The relative positional relationship among the M delay units 302 is defined to correspond to the size (M pixels×N pixels) of the window WN shown in FIG. 4. Typically, one delay unit 302 and the adjacent delay unit 302 are spaced apart by the number of pixels corresponding from the end of the window WN on one line to the right end of the window on the next line shown in FIG. 4.

The edge code value is outputted in parallel from the respective delay unit 302. A pattern matching circuit 304 performs the pattern matching process in the window WN set at a certain position of the input image by collectively evaluating the edge code values outputted in parallel from the delay units 302.

Furthermore, the image information of each pixel contained in the input image provided from the imaging device 200 is sequentially inputted from the left side of the plane of the drawing of the line buffer 300, and entirely moves to the right side of the plane of the drawing with elapse of time. Since the positional relationship of the delay unit 302 with respect to the line buffer 300 is fixed, the position of the window WN with respect to the input image substantially moves sequentially when the input image entirely moves.

Therefore, in the image processing device 100 according to the present embodiment, the real time process as described above is achieved by synchronously executing the output of the edge code by the respective delay units 302 and the pattern matching process by the pattern matching circuit 304 at the input cycle of the image information of each pixel contained in the input image.

(Compression/Decompression of Edge Code Image)

As hereinafter described, in the image processing device 100 according to the present embodiment, the edge code image is sequentially stored in the storage unit after being compressed, and one part of the compressed edge code image that is stored is decompressed and the pattern matching process is performed based on the decompressed edge code image. The circuit configuration becomes small by using the compression/decompression process of the edge code image. In the present embodiment, "compression of edge code" refers to a process of reducing the amount of information while maintaining the effective information contained in the edge code image.

In the present embodiment, each element contained in the edge code image includes the edge code value and the valid/invalid flag indicating valid/invalid of the edge code value. In other words, the valid edge code value and the invalid edge code value coexist in the edge code image. The image processing device 100 according to the present embodiment assigns information representing the edge code value for the element having a valid edge code value to the element having an invalid edge code value to compress the edge code image. As a specific example of such compression, a configuration of performing compression using differentiation (difference) with respect to a series of edge code values will be described. Other arbitrary methods can be adopted as long as the above-described principle is used.

The compression/decompression process of the edge code image will now be described.

Figure 8:
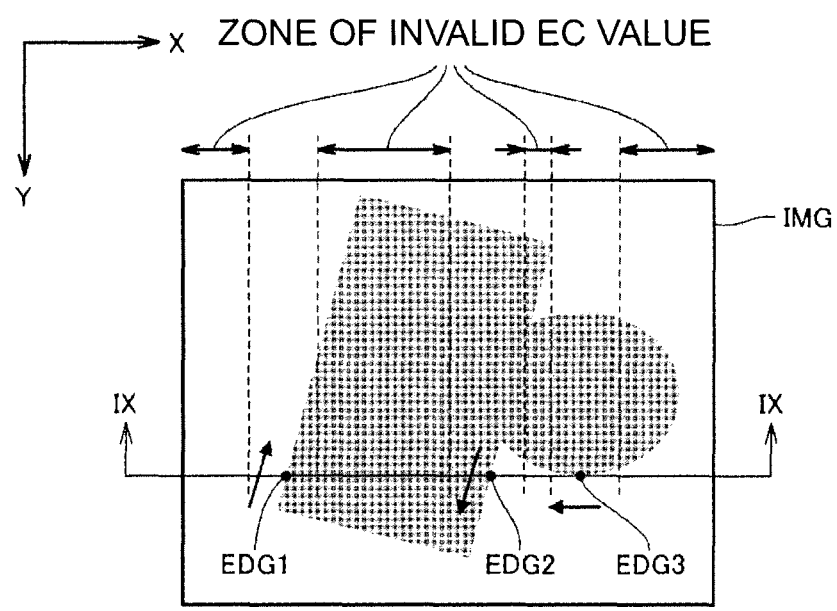
FIG. 8 is a view describing a compression/decompression process of the edge code according to the embodiment of the present invention.
Figure 9:
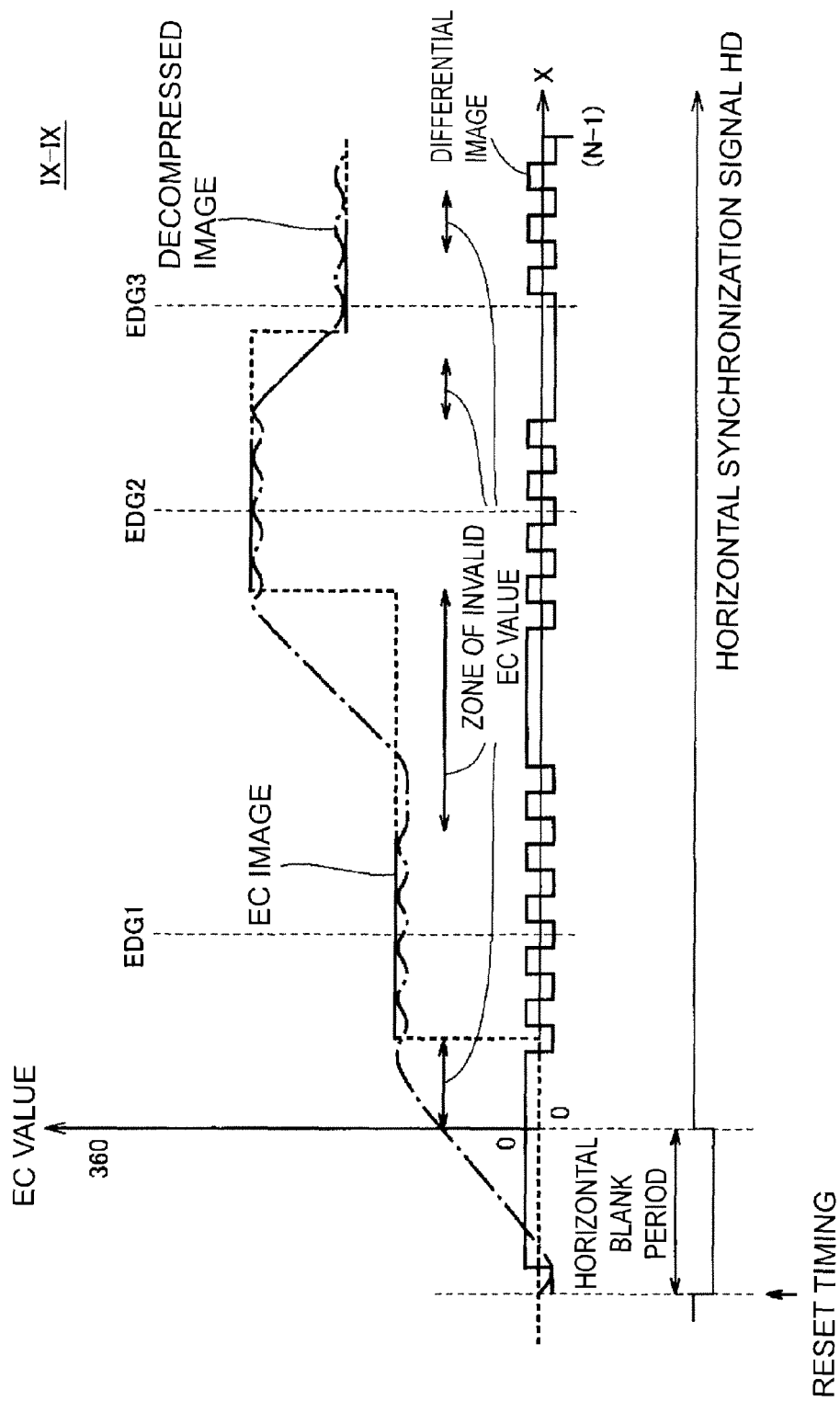
FIG. 9 is a view showing results of an edge code extraction process along line IX-IX of the input image shown in FIG. 8.

FIG. 8 is a view describing the compression/decompression process of the edge code according to the embodiment of the present invention. FIG. 9 is a view showing results of the edge code extraction process along line IX-IX of the input image IMG shown in FIG. 8.

First, the input image IMG in which the target work is imaged, as shown in FIG. 8, will be considered. When the edge code extraction process is executed along line IX-IX of the input image IMG shown in FIG. 8, the valid edge code values are acquired near three edges EDG1, EDG2, EDG3. As a result, the edge code image configured by the edge code values on line IX-IX is obtained, as shown in FIG. 9. In other words, the edge code value is invalid at a portion distant from the edges EDG1, EDG2, EDG3 of the input image IMG.

Generally, since the target work has a physical size of a certain extent, the edge code value is less likely to greatly change at a small pixel interval in the input image obtained by imaging the target work. In other words, the direction of the edge, that is, the contour of the target work, the structure of the surface, and the like need to physically change in order for the edge code value to greatly change, but the amount of change rate thereof is self-limited.

Among the profile of the edge code value shown in FIG. 9, only the vicinity of the edges EDG1, EDG2, EDG3 have a valid edge code value, and other zones have an invalid edge code value. In other words, in the profile of the edge code image shown in FIG. 9, a valid zone of the edge code value (solid line portion) and an invalid zone of the edge code value (chain dashed line portion) alternately appears. Considering the profile of the edge code image, the amount of information assigned only to the valid zone in a concentrated manner, and the amount of information substantially does not exist in the invalid zone. Thus, if the same number of bits is assigned per each pixel for both the valid zone and the invalid zone, the number of bits assigned to the invalid zone becomes a waste.

Thus, in the image processing device 100 according to the present embodiment, the amount of information of the valid zone is diffused to the entire edge code image. In other words, the amount of information used in the entire edge code image is compressed by reducing the number of bits assigned to each pixel, and effectively using the number of bits assigned to each pixel as a whole.

In other words, the image processing device 100 according to the present embodiment assigns the increase/decrease information from the edge code value contained in the valid zone for the edge EDG1 to the edge code value contained in the valid zone for the edge EDG2 to the element corresponding to the invalid zone when the valid zone for the edge EDG1 in which the valid edge code values continue, the invalid zone in which the invalid edge code values continue following the valid zone for the edge EDG1, and the valid zone for the edge EDG2 in which the valid edge code values continue following the invalid zone appear in the profile of the sequentially outputted edge code value.

In other words, information for specifying the valid edge code value is assigned in correspondence to an element generated before the element having a valid edge code value and having an invalid edge code value.

Therefore, various methods can be adopted for a method of diffusing the amount of information of the valid zone to the entire edge code image, but the increase/decrease information (differential image) obtained by differentiating (differencing) the profile of the edge code image is used in the present embodiment. In other words, only the amount of change between the adjacent elements is held as information for a series of elements configuring the edge code image, and the edge code image of the necessary portion is decompressed when performing the pattern matching process.

More specifically, the differential image as shown in FIG. 9 is generated by sequentially calculating the difference in the edge code value between the adjacent elements of the edge code image. The differential image shows whether the edge code value in the element at a certain position is increasing or decreasing with respect to the edge code value of the element positioned one before. The amount of information assigned to each element is only 1 bit when such an differential image is used. Thus, the decompressed image as shown in FIG. 9 is obtained by storing the differential image in the memory and integrating along the input order of the differential images when performing the pattern matching process. The pattern matching process is then executed based on the decompressed image.

Comparing the profile of the edge code image before the compression and the profile of the decompressed image after the decompression, a waveform is different in the zone in which the edge code value is invalid. However, matching accuracy is not influenced since the information of the zone (pixel) in which the edge code value is valid is basically used in the pattern matching process.

(Hardware Configuration)

The hardware configuration for performing the pattern matching process including the compression/decompression process of the edge code will now be described.

Figure 10:
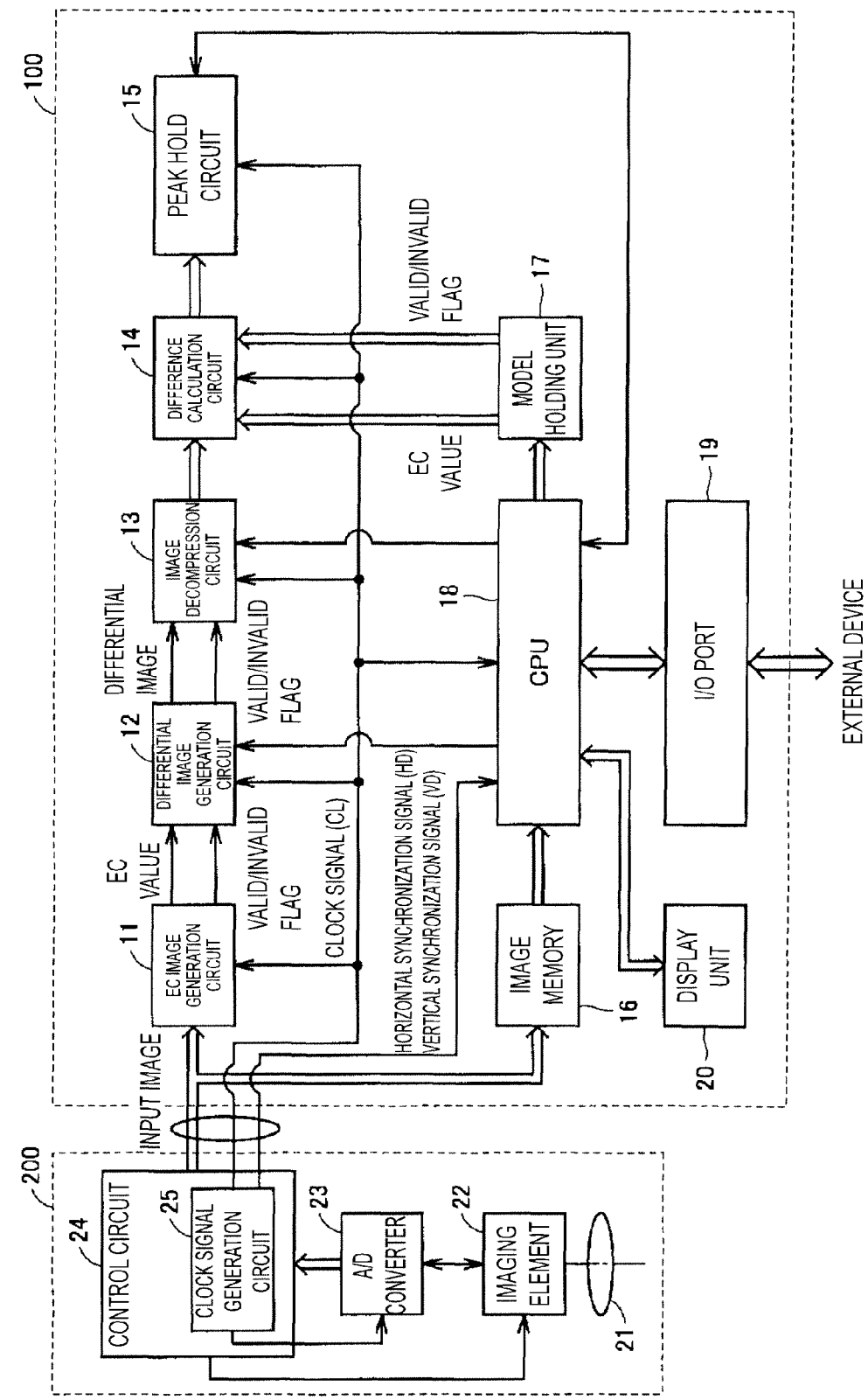
FIG. 10 is a schematic view showing a hardware configuration of the pattern matching processing system according to the embodiment of the present invention.

FIG. 10 is a schematic view showing the hardware configuration of the pattern matching processing system 1 according to the embodiment of the present invention.

First, the imaging device 200 will be described with reference to FIG. 10. The imaging device 200 includes a lens 21, an imaging element 22, an A/D (Analog to Digital) converter 23, and a control circuit 24, and outputs the input image (image signal) obtained by imaging the target work.

The lens 21 is arranged on an optical axis entering the imaging element 22, and guides the reflected light from the subject to the imaging element 22 after being optically adjusted. The imaging element 22 typically includes a CCD (Coupled Charged Device), a CMOS (Complementary Metal Oxide Semiconductor) sensor, and the like, and outputs an image signal corresponding to the intensity of the incident light. The ND converter 23 converts the image signal (analog signal) from the imaging element 22 to a digital signal. The A/D converter 23 typically samples the image signal from the imaging element 22 at a resolution of a predetermined number of bits, and outputs a corresponding digital value. The control circuit 24 is responsible for the overall control of the imaging process in the imaging device 200. The control circuit 24 includes a clock signal generation circuit 25 for generating a clock signal CL having a predetermined cycle. The readout of the image signal from the imaging element 22 and the A/D conversion process in the A/D converter 23 are periodically executed according to the clock signal CL generated by the clock signal generation circuit 25. In other words, the control circuit 24 gives a control command to the imaging element 22 to output the detected image signal along a predetermined scanning direction according to the clock signal CL. Therefore, the image information of each pixel contained in the input image is outputted in time-series along the predetermined scanning direction as an image signal from the A/D converter 23. The control circuit 24 outputs the image signal outputted from the A/D converter 23 to the image processing device 100. The control circuit 24 also outputs the clock signal CL generated by the clock signal generation circuit 25 to the image processing device 100.

The input image may be a monochrome (grayscale) image or a color image. In the case of the monochrome image, the gray value represented by a predetermined number of bits (typically, eight bits) is outputted as an image signal indicating each pixel. In the case of the color image, information in which the gray value of the basic colors (typically, red (R), green (G), blue (B)) is respectively represented with a predetermined number of bits (typically, eight bits) is outputted as an image signal indicating each pixel. Alternatively, information representing the gray value of cyan (C), magenta (M), and yellow (Y), which are complementary colors of three primary colors of light may be used. If the imaging device 200 has greater number of bands (sensitivity wavelength), the gray value of a number corresponding to the number of bands may be outputted.

The image processing device 100 includes an EC (Edge Code) image generation circuit 11, a differential image generation circuit 12, an image decompression circuit 13, a difference calculation circuit 14, a peak hold circuit 15, an image memory 16, a model holding unit 17, a CPU (Central Processing Unit) 18, an I/O (Input/Output) port 19, and a display unit 20, and executes the pattern matching process on the input image acquired by the imaging device 200. The EC image generation circuit 11, the differential image generation circuit 12, the image decompression circuit 13, the difference calculation circuit 14, and the peak hold circuit 15 operate in synchronization with each other according to the clock signal CL.

The EC image generation circuit 11 executes the edge extraction process (described later), based on the gray value of the input image received from the imaging device 200 to extract the edge and to specify the changing direction of the extracted edge. The EC image generation circuit 11 outputs the specified changing direction of the edge as an edge code value. More specifically, the EC image generation circuit 11 sequentially generates the "edge code value (EC value)" and the "valid/invalid flag" every time the gray value of each pixel for the input image is inputted. In the present embodiment, a case of representing the EC value ($0° \leq$ EC value$<360°$) with six bits (64 tones) will be illustrated by way of example. The "valid/invalid flag" is the information of one bit indicating whether the corresponding edge code is valid or invalid. In other words, if a valid edge code value is extracted at the corresponding position (in other words, if sufficiently large edge intensity appears at the corresponding position), "1" indicating a valid value is outputted as the value of the "valid/invalid flag", and the extracted edge code value is outputted as the "EC value". If a valid edge code value is not extracted at the corresponding position (in other words, if the edge intensity at the corresponding position is small), "0" indicating an invalid value is outputted as the value of the "valid/invalid flag", and an indefinite value is outputted as the "EC value".

The differential image generation circuit 12 generates a differential image as shown in FIG. 9 based on a series of edge code values and the valid/invalid flag (and also edge code image) continuously outputted from the EC image generation circuit 11. The differential image has an element of the same number as the input image, but the amount of information assigned to each element is compressed from six bits to one bit. As hereinafter described, the differential image generation circuit 12 includes a storage unit for sequentially storing the edge code image (differential value and valid/invalid flag) after the compression. One part of the compressed edge code image stored in the storage unit is sequentially outputted to the image decompression circuit 13.

As hereinafter described, the image decompression circuit 13 holds the compressed edge code image (differential value and valid/invalid flag) inputted in time-series by a predetermined element, and decompresses the held edge code image after the compression to the edge code image. The image decompression circuit 13 then provides the decompressed edge code image to the difference calculation circuit 14.

The difference calculation circuit 14 performs the pattern matching process on the decompressed edge code image received from the image decompression circuit 13. In other words, the difference calculation circuit 14 calculates the similarity degree between the decompressed edge code image and the model image defined in advance. More specifically, the difference calculation circuit 14 reads out the edge code image (coordinate, as well as, edge code value and valid/invalid flag at each coordinate) representing the standard pattern (model image) registered in advance from the model holding unit 17, and compares the read edge code image of the model image and the decompressed edge code image provided from the difference calculation circuit 14. Furthermore, the difference calculation circuit 14 outputs the degree of similarly calculated by comparing the edge code images to the peak hold circuit 15.

The peak hold circuit 15 holds the highest value (peak value) of the similarity degree outputted from the difference calculation circuit 14. In this case, the peak hold circuit 15 associates and holds the window position on the input image corresponding to the timing the peak value appeared based on the clock signal CL. As hereinafter described, the position of the window WN (FIG. 4) set on the input image substantially moves one pixel at a time every time a new image signal worth one pixel contained in the input image is inputted to the image processing device 100. Thus, the portion having a high similarity degree with the model image, that is, that matches the most with the model image can be specified by specifying the window position on the input image corresponding to the timing the peak value appeared.

The CPU 18 is responsible for the overall control in the image processing device 100. The CPU 18 can use a ROM (Read Only Memory) for storing programs, and RAM (Random Access Memory) for work (both of which are not shown). The CPU 18 develops the program read out from the ROM on the RAM and executes the process.

The image memory 16 is a storage region for temporarily storing the input image outputted from the imaging device 200, where the input image stored in the image memory 16 is typically displayed on the display unit 20 as a result of the pattern matching process in accordance with the position specified in the peak hold circuit 15.

The I/O port 19 intermediates a data exchange between an external device connected to the image processing device 100 and the CPU 18.

The display unit 20 displays or notifies the result of the pattern matching process in the image processing device 100. The display unit 20 typically includes a liquid crystal display, an LED (Light Emitting Diode), and the like.

A detailed configuration of each circuit shown in FIG. 10 will be described below.

(EC Image Generation Circuit)

Figure 11:
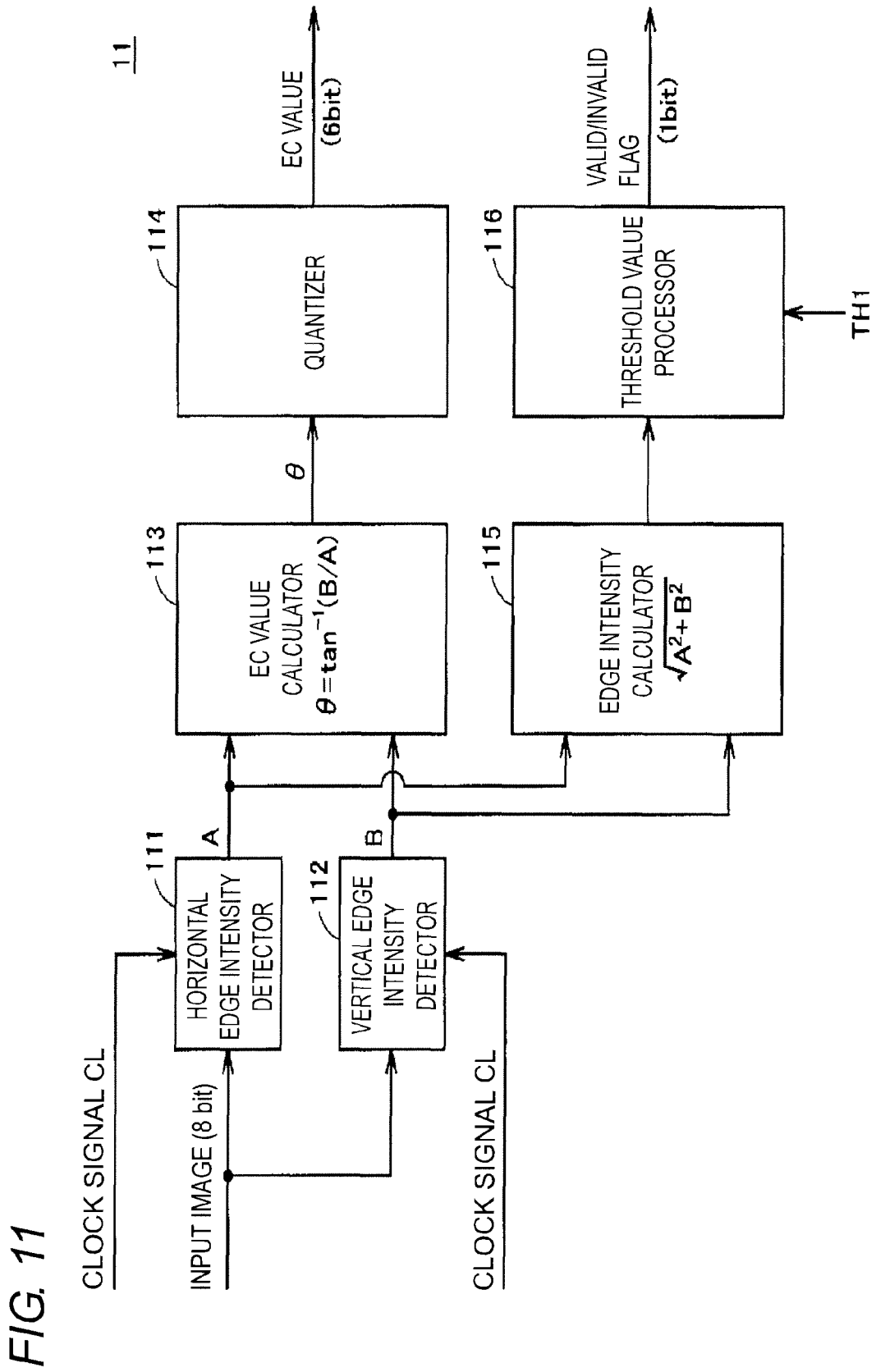
FIG. 11 is a block diagram showing a more detailed configuration of an EC image generation circuit shown in FIG. 10.

FIG. 11 is a block diagram showing a more detailed configuration of the EC image generation circuit 11 shown in FIG. 10. With reference to FIG. 11, the EC image generation circuit 11 includes a horizontal edge intensity detector 111, a vertical edge intensity detector 112, an EC value calculator 113, a quantizer 114, an edge intensity calculator 115, and a threshold value processor 116.

The horizontal edge intensity detector 111 calculates the edge intensity in the horizontal direction based on the gray values of the adjacent pixels for each pixel contained in the input image provided from the imaging device 200 (FIG. 10). Similarly, the vertical edge intensity detector 112 calculates the edge intensity in the vertical direction based on the gray values of the adjacent pixels for each pixel contained in the input image provided from the imaging device 200 (FIG. 10). A known method can be adopted for the configuration of calculating the edge intensity, but a maximum value of the difference in the gray values between the adjacent pixels may be assumed as the edge intensity. The horizontal edge intensity detector 111 and the vertical edge intensity detector 112 operate according to the clock signal CL, and respectively calculate the edge intensity every time a new pixel contained in the input image is inputted, and output the result to the EC value calculator 113 and the edge intensity calculator 115.

The EC value calculator 113 calculates the changing direction (angle θ) of the edge corresponding to the edge code value based on the horizontal edge intensity and the vertical edge intensity calculated in the horizontal edge intensity detector 111 and the vertical edge intensity detector 112, respectively. More specifically, the EC value calculator 113 calculates the angle θ according to the following equation (1) with the horizontal edge intensity calculated by the horizontal edge intensity detector 111 as "A" and the vertical edge intensity calculated by the vertical edge intensity detector 112 as "B".

$$\text{angle}\theta=\tan-1(B/A) \tag{1}$$

The EC value calculator 113 outputs the calculated angle A to the quantizer 114. The following equation (1') may be used when defining the EC value in the range of between 0° and 180°.

$$\text{angle}\theta=\tan-1|B/A| \tag{1'}$$

The quantizer 114 quantizes the angle θ provided from the EC value calculator 113 to six bits, and outputs as the edge code value.

In FIG. 11, a case in which a monochrome image having a gray value of eight bits (256 tones) per each pixel is provided to the horizontal edge intensity detector 111 and the vertical edge intensity detector 112 is shown, but a color image may also be provided. The amount of information of the edge code value can be suppressed to the number of bits same as in the case of the monochrome image even if the color image having a greater number of bits is provided.

Furthermore, whether or not the calculated edge code is valid is determined for the edge intensity calculator 115 and the threshold value processor 116. In other words, whether or not a sufficiently strong edge exists at the target position of the input image is determined based on the edge intensity, and the calculated edge code value is made valid at the relevant timing only if the edge having a predetermined intensity exists.

In other words, the edge intensity calculator 115 calculates the edge intensity in each pixel of the input image according to the following equation (2) based on the horizontal edge intensity A calculated by the horizontal edge intensity detector 111 and the vertical edge intensity B calculated by the vertical edge intensity detector 112.

$$\text{Edge intensity} = \sqrt{(A2+B2)} \quad (2)$$

The threshold value processor 116 compares the edge intensity calculated by the edge intensity calculator 115 with a threshold value TH1 set in advance. The threshold value processor 116 outputs "1" indicating a valid value for the valid/invalid flag if the calculated edge intensity exceeds the threshold value TH1, and outputs "0" indicating an invalid value for the valid/invalid flag if the calculated edge intensity does not exceed the threshold value TH1.

(Differential Image Generation Circuit)

Figure 12:
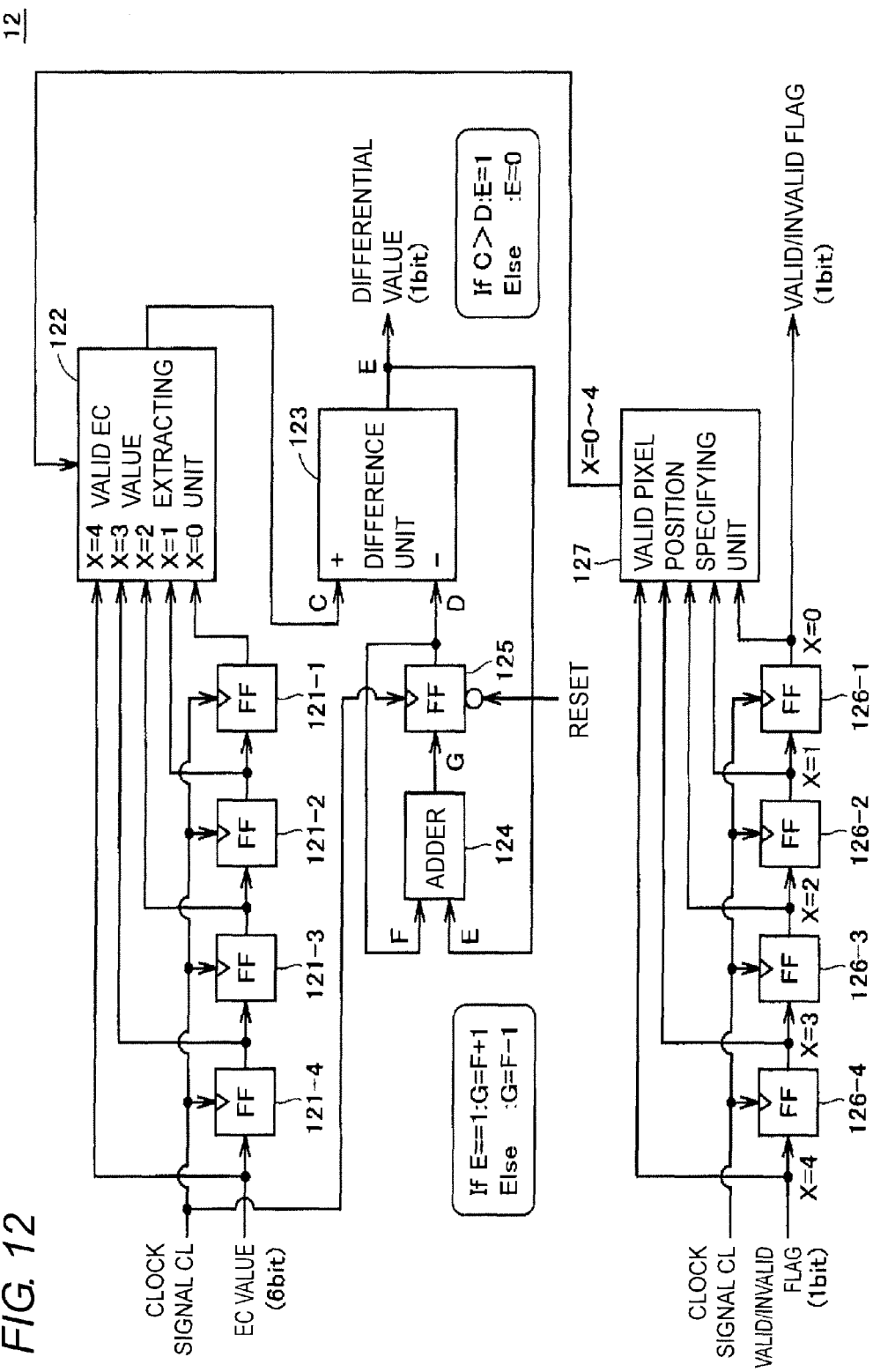
FIG. 12 is a block diagram showing a more detailed configuration of a differential image generation circuit shown in FIG. 10.

FIG. 12 is a block diagram showing a more detailed configuration of the differential image generation circuit 12 shown in FIG. 10. With reference to FIG. 12, the differential image generation circuit 12 includes flip-flops (FF) 121-1 to 121-4, 125, 126-1 to 126-4, a valid EC value extracting unit 122, a difference unit 123, an adder 124, and a valid pixel position specifying unit 127.

The flip-flops 121-1 to 121-4 are typical examples of delay elements connected in series, and sequentially shift the data in synchronization according to the clock signal CL. The edge code value generated by the EC image generation circuit 11 (FIG. 10) is sequentially inputted to the input end of the flip-flop 121-4. The output end of the flip-flop 121-1 is connected to the valid EC value extracting unit 122. Furthermore, the edge code value at each input end of the flip-flops 121-1 to 121-4 is also inputted to the valid EC value extracting unit 122.

In this case, an edge code value generated at time t by the EC image generation circuit 11 (FIG. 10) is represented as EC(t), and the time worth one cycle of the clock signal CL is represented as Dc. At time t, the EC(t-4Dc) is outputted from the flip-flop 121-1, the EC(t-3Dc) is outputted from the flip-flop 121-2, the EC(t-2Dc) is outputted from the flip-flop 121-3, and the EC(t-Dc) is outputted from the flip-flop 121-4. In other words, the flip-flops 121-1 to 121-4 coincide the timing for a plurality of continuous edge code values inputted at a different timing.

The valid EC value extracting unit 122 outputs to the difference unit 123 one corresponding edge code value of the EC values (EC(t), EC(t-Dc), EC(t-2Dc), EC(t-3Dc), EC(t-4Dc)) respectively held by the flip-flops 121-1 to 121-4 according to a valid pixel position X specified by the valid pixel position specifying unit 127, to be described later. As shown in FIG. 9, if the valid zone of two edge code values exists with the invalid zone therebetween, the edge code value of the valid zone that appears next needs to be predicted after the valid zone is terminated and before the next valid zone appears. In other words, the edge code value needs to be changed in advance after the termination of a certain valid zone and before the next valid zone appears, as shown by the decompressed image of FIG. 9. The valid pixel position specifying unit 127 foresees at which position the next valid zone appears. Specifically, the valid pixel position specifying unit 127 outputs the having the smallest value of X holding the valid edge code value of the series of flip-flops 121-1 to 121-4 as the valid pixel position X. The valid EC value extracting unit 122 outputs the edge code value held by the corresponding flip-flop 121 according to the extracted valid pixel position X.

The flip-flops 126-1 to 126-4 are typical examples of delay elements connected in series, and sequentially shift the data in synchronization according to the clock signal CL. The valid/invalid flag value generated by the EC image generation circuit 11 (FIG. 10) is sequentially inputted to the input end of the flip-flop 126-4. The output end of the flip-flop 126-1 is connected to the valid pixel position specifying unit 127. Furthermore, the valid/invalid flag value at each input end of the flip-flops 126-1 to 126-4 is also inputted to the valid pixel position specifying unit 127.

As described above, the valid pixel position specifying unit 127 specifies that having the smallest value of the corresponding valid pixel position X of those in which the value is "1" indicating valid of the inputted valid/invalid flag values. The valid pixel position specifying unit 127 then outputs the specified value of X to the valid EC value extracting unit 122. If all of the inputted valid/invalid flag values are "0", the valid pixel position specifying unit 127 outputs "4" as the valid pixel position X.

The difference unit 123 compares a magnitude relationship of the edge code value (current value) outputted from the valid EC value extracting unit 122 and the edge code value (previous value) in the cycle one before the relevant cycle in each cycle of the clock signal CL, and outputs a differential value (one bit) based on the difference as the increase/decrease information. In other words, the difference unit 123 outputs "1", which means increase in terms of differential value, if the edge code value (current value) is greater than the edge code value (previous value), and outputs "0", which means decrease in terms of differential value, if the edge code value (current value) is not greater than the edge code value (previous value).

The adder 124 and the flip-flop 125 are circuits for calculating the edge code value (previous value). The adder 124 calculates a new edge code value (previous value) by adding or subtracting "one bit" to the edge code value (previous value) outputted from the flip-flop 125 according to the differential value outputted from the difference unit 123. The new edge code value (previous value) calculated by the adder 124 is provided to, and held by the flip-flop 125. The new edge code value (previous value) provided from the adder 124 to the flip-flop 125 is used as the edge code value (previous value) in the next clock cycle.

The number of connecting stages of the flip-flops 121 and 126 shown in FIG. 12 corresponds to the number of elements (number of pixels) for foreseeing the valid zone that appears next. Therefore, a great number of stages (e.g., 16 stages or 32 stages) is preferably provided so that the foreseeing amount is preferably increased, and the information on the valid edge code value in the original edge code image can be compressed/decompressed at high accuracy. The edge code image can be more accurately compressed even if the foreseeing accuracy is relatively low by assigning a greater amount of information to the differential value (differential image) that is the increase/decrease information.

(Image Decompression Circuit)

Figure 13:
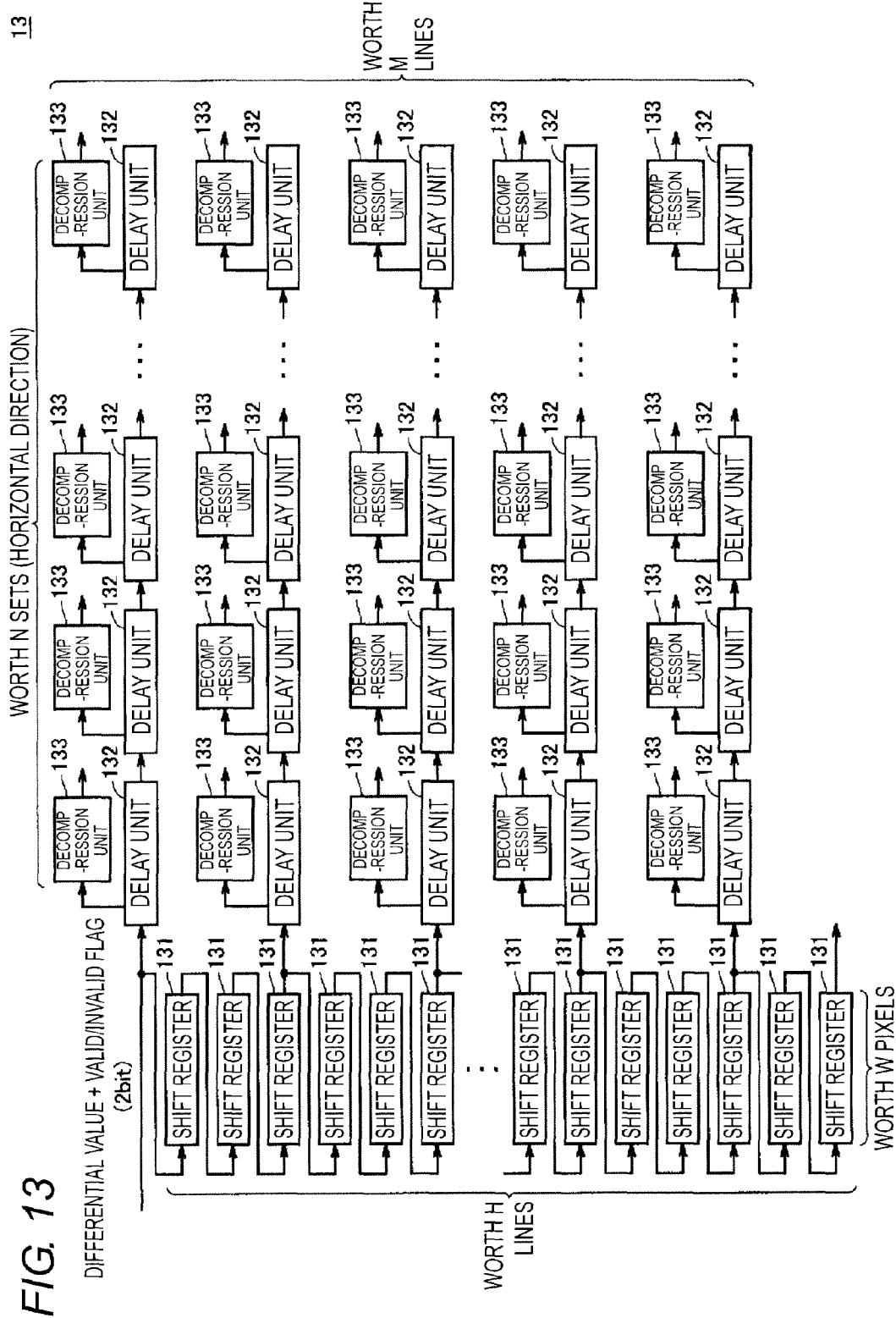
FIG. 13 is a block diagram showing a more detailed configuration of an image decompression circuit shown in FIG. 10.

FIG. 13 is a block diagram showing a more detailed configuration of the image decompression circuit 13 shown in FIG. 10. With reference to FIG. 13, the image decompression circuit 13 includes a shift register 131, a delay unit 132, and a decompression unit 133.

A plurality of shift registers 131 is series-connected in sequence, and sequentially stores the differential value and the valid/invalid flag provided from the differential image generation unit 12 (FIG. 10) in FIFO. One shift register 131 typically has a storage capacity of storing the differential value and the valid/invalid flag worth one horizontal line. In other words, each shift register 131 has a memory capacity of 2×W×H (bit) if the input image has a size of W pixels×H lines. The differential image for one input image (differential value and valid/invalid flag for each element) can be temporarily stored by preparing the shift register 131 by the number same as the number of lines of the input image. As in the example described above, the storage capacity of the shift register 131 can be reduced to ¼ in simple calculation compared to when storing a monochrome image in which each element is defined with a gray value of eight bits as is.

A set of the delay unit 132 and the decompression unit 133 is arranged by the number of evaluation devices for performing the pattern matching process in the window set in the input image. In other words, the pattern matching process based on the edge code is performed in each set of the delay unit 132 and the decompression unit 133.

In FIG. 13, n sets of the delay unit 132 and the decompression unit 133 are arranged in the horizontal direction, and m sets of the delay unit 132 and the decompression unit 133 are arranged in the vertical direction. This arrangement means that m evaluation lines can be set in the window, and n evaluation positions can be set on each evaluation line.

In FIG. 13, a configuration in which the set of the delay unit 132 and the decompression unit 133 corresponding to each evaluation line is connected to every four shift levers 131. This corresponds to a configuration of decimating one part and performing the evaluation thereon instead of on all horizontal lines contained in the window set in the input image. It should be recognized that all horizontal lines contained in the window may be the target of evaluation. In this case, the delay unit 132 is connected to the output end of each shift register 131.

(Model Image)

To facilitate the understanding on the delay unit 132 and the decompression unit 133, the model image used in the pattern matching process according to the present embodiment will be described first.

Figure 14:
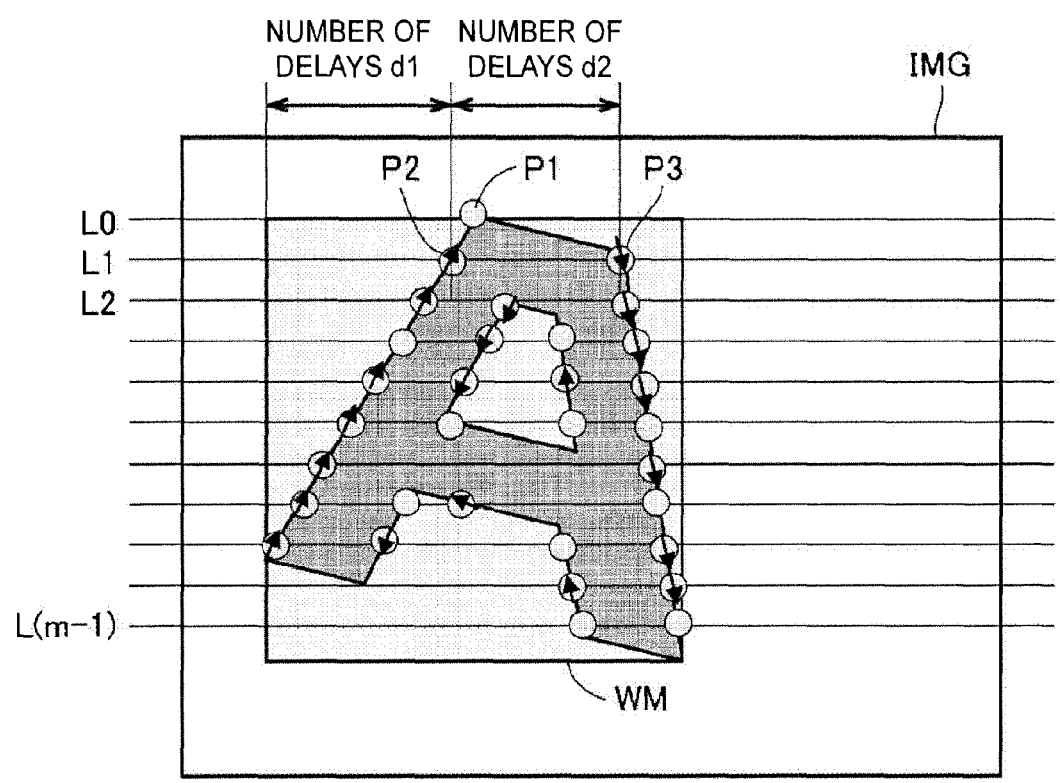
FIG. 14 is a schematic view showing one example of a model image registered in the image processing device according to the embodiment of the present invention.

FIG. 14 is a schematic view showing one example of a model image registered in the image processing device according to the embodiment of the present invention.

With reference to FIG. 14, an input image IMG is acquired by imaging a standard work, which becomes a reference of the pattern matching process. A window WN is set in a range to be the model image in the input image IMG. A plurality of edge codes used in the pattern matching process is extracted from the partial image in the window WN.

More specifically, m evaluation lines L0, L1, ..., L(m−1) are set with respect to the window WN, and the edge code is calculated on each evaluation line. For example, in the model image shown in FIG. 14 (region shown with alphabet "A"), the valid edge code is extracted at a coordinate point P1 on the evaluation line L0, and the valid edge code is extracted at coordinates P2 and P3 on the evaluation line L1. As shown in FIG. 14, the valid edge codes are also extracted on the remaining evaluation lines. Considering the edge code on the evaluation line L1 of the extracted edge codes, the coordinate P1 is at a position spaced apart by a distance d1 from the left end of the window WN, and the coordinate P2 is at a position spaced apart by a distance d2 from the coordinate P1.

In the pattern matching process based on the edge code according to the present embodiment, the similarity degree (correlation value) may be evaluated at the respective coordinates where the valid edge codes are extracted. In other words, the position (coordinate) of the pixel where the valid edge code is not extracted on a certain evaluation line does not need to be the target of evaluation. Therefore, at which position the similarity degree with the edge code is to be evaluated on each evaluation line needs to be registered in advance.

In the image processing device 100 according to the present embodiment, the model image is defined using the relative positional information indicating the difference in the relative positions between the adjacent evaluation positions on the same evaluation line. Such relative positional information uses "number of delays" indicating the number of elements that exists between the adjacent evaluation positions. A configuration for extracting the differential value (or edge code value to be decompressed) at a coordinate spaced apart by such "number of delays" on the same evaluation line is the delay unit 132 shown in FIG. 13. The differential value at each evaluation position registered in advance is then outputted to the decompression unit 133 through the delay unit 132. The edge code value is decompressed from the differential value at each evaluation position in the decompression unit 133.

(Delay Unit and Decompression Unit)

Figure 15:
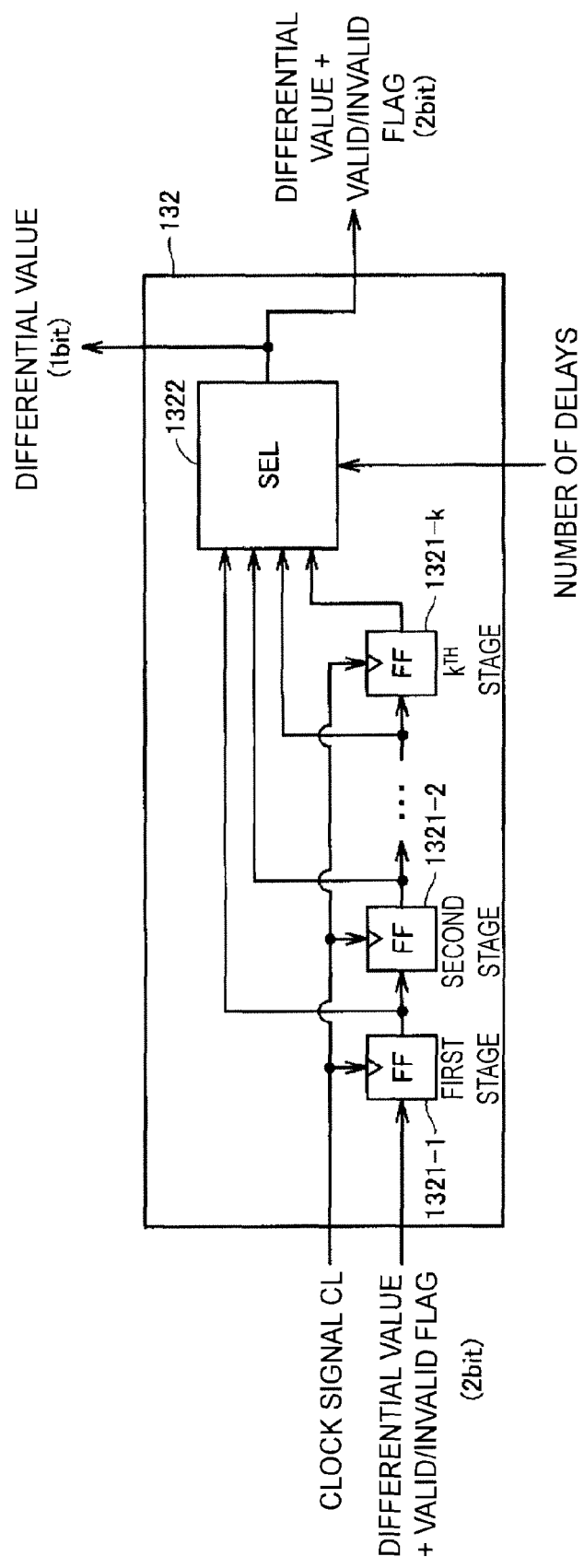
FIG. 15 is a block diagram showing a more detailed configuration of a delay unit shown in FIG. 13.

FIG. 15 is a block diagram showing a more detailed configuration of the delay unit 132 shown in FIG. 13. With reference to FIG. 15, the delay unit 132 includes flip-flops (FF) 1321-1, 1321-2, ..., 1321-$k$, and a selector (SEL) 1322.

The flip-flop 1321-1 to 1321-$k$ are typical examples of delay elements connected in series, and sequentially shift the data in synchronization according to the clock signal CL. The value same as the differential value and the valid/invalid flag held at a predetermined position of the shift register 131 (FIG. 13) (connection node of adjacent shift register 131) is sequentially inputted to the input end of the flip-flop 1321-1. The respective output ends of the flip-flops 1321-1 to 1321-$k$ are connected to the selector 1322.

The selector 1322 is typically configured with a multiplexer. The selector 1322 outputs one of the outputs of the flip-flops 1321-1 to 1321-$k$ to the delay unit 132 and the corresponding decompression unit 133 connected to the post-stage according to the corresponding number of delays stored in the model holding unit 17, to be described later.

For example, if the number of delays is set to "1", the selector 1322 selects the output of the flip-flop 1321-1. The delay amount between the target delay unit 132 and the delay unit 132 connected to the pre-stage thereof is worth one pixel. Therefore, the coordinate spaced apart by one pixel on the target evaluation line of the input image from the evaluation position, which is the target for the set of the delay unit 132 and the decompression unit 133 connected at the pre-stage, is set as the evaluation position. Similarly, the target evaluation position on the same evaluation line can be freely set by setting the number of delays according to the model image.

Figure 16:
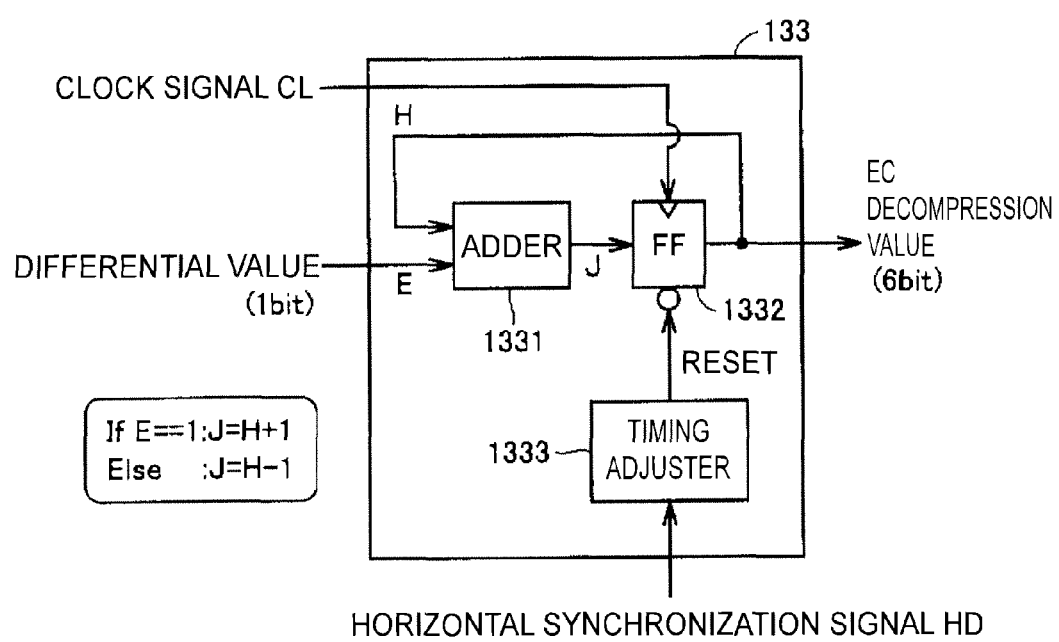
FIG. 16 is a block diagram showing a more detailed configuration of a decompression unit shown in FIG. 13.

FIG. 16 is a block diagram showing a more detailed configuration of the decompression unit 133 shown in FIG. 13. With reference to FIG. 16, the decompression unit 133 includes an adder 1331, a flip-flop (FF) 1332, and a timing adjuster 1333.

The adder 1331 and the flip-flop 1332 are an integration circuit for calculating the edge code decompression value from the differential value. The adder 1331 calculates the edge code decompression value (current value) by adding "+1" or "−1" to the edge code decompression value (previous value) outputted from the flip-flop 1332 according to the differential value outputted from the corresponding delay unit 132 (FIG. 15). The edge code decompression value (current value) calculated by the adder 1331 is provided to, and held by the flip-flop 1332, and also outputted to the difference calculation circuit 14 arranged at the post-stage. The edge code decompression value (current value) provided to the flip-flop 1332 is used as the edge code decompression value (previous value) in the next clock cycle.

The timing adjuster 1333 resets the flip-flop 1332 at the timing defined in advance. Since the edge code decompression value is typically calculated for every horizontal line of the input image, the calculation of the edge code decompression value on the next horizontal line may not be influenced after the calculation of the edge code decompression value for a certain horizontal line is completed. The timing adjuster 1333 outputs a reset signal to the flip-flop 1332 at the timing of the horizontal blank period, and clears the integration value held by the flip-flop 1332 to zero. When handling the input image as a pixel set on one horizontal line, the resetting is not necessarily required by the timing adjuster 1333.

Therefore, the "edge code (EC) decompression value" and the "valid/invalid flag value" for the corresponding evaluation position are outputted from each set of delay unit 132 and decompression unit 133.

(Difference Calculation Circuit and Model Holding Unit)

Figure 17:
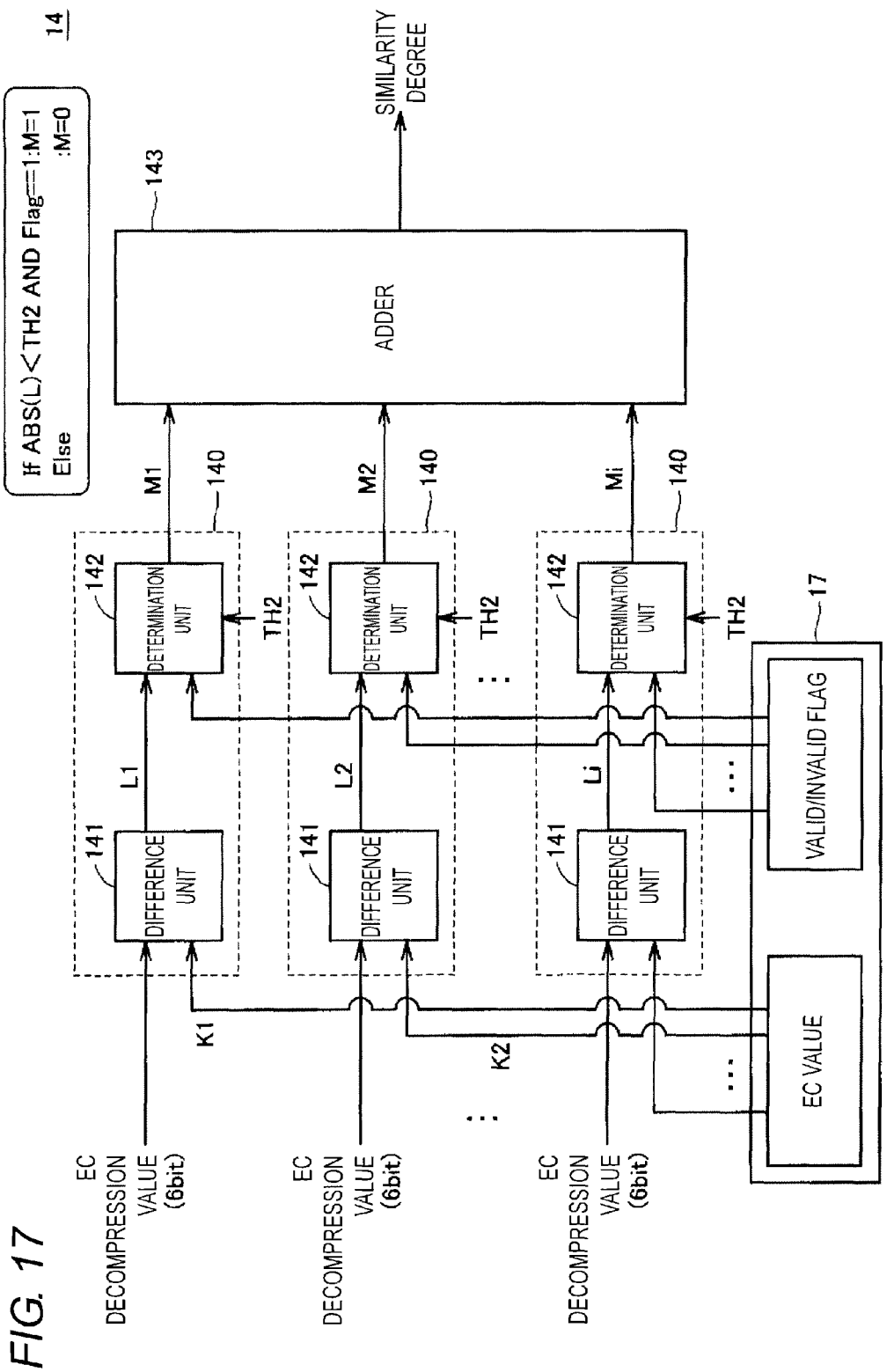
FIG. 17 is a block diagram showing a more detailed configuration of a difference calculation circuit shown in FIG. 10.
Figures 18A, 19:
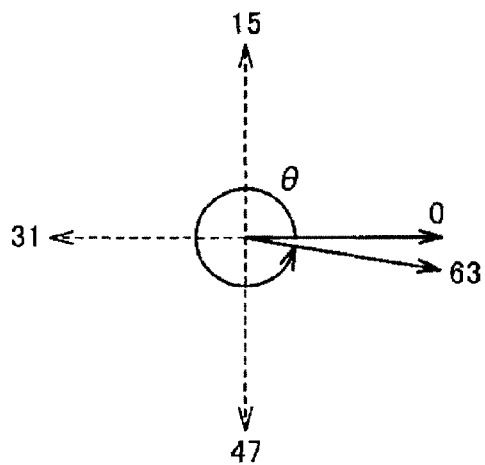

FIG. 17 is a block diagram showing a more detailed configuration of the difference calculation circuit 14 shown in FIG. 10. FIGS. 18A and 18B are views showing one example of a data structure held by the model holding unit 17 shown in FIG. 10. FIG. 19 is a view schematically showing an angle indicating the edge code value shown in FIGS. 18A and 18B.

With reference to FIG. 17, the difference calculation circuit 14 includes a plurality of difference units 141, a determination unit 142 corresponded with each difference unit 141, and an adder 143.

Each set of the difference unit 141 and the determination unit 142 determines success and fail of pattern matching at the evaluation position by comparing the edge code decompression value and the valid/invalid flag provided from the decompression unit 133 (FIG. 16) arranged at the pre-stage, and the corresponding edge code value and the value of the valid/invalid flag read out from the model holding unit 17. The adder 143 adds up the result outputted from each set of the difference unit 141 and the determination unit 142, and outputs the added result to the peak hold circuit 15 (FIG. 10) as the similarity degree by pattern matching.

More specifically, each difference unit 141 calculates a difference value (L1, L2, . . . , Li) of the edge code decompression value from the decompression unit 133 arranged at the pre-stage, and the corresponding edge code value read out from the model holding unit 17. Each determination unit 142 outputs, to the adder 143, "1" that means matching is successful at the corresponding evaluation position when both of (1) absolute value of the difference value provided from the difference unit 141 arranged at the pre-stage is smaller than the threshold TH2, and (2) the corresponding valid/invalid flag read out from the model holding unit 17 is "1" are satisfied. If (1) or (2) is not satisfied, the determination unit 142 outputs, to the adder 143, "0" that means matching has failed at the corresponding evaluation position.

In other words, the condition of (1) is a condition for determining that matching is successful only when the value of the edge code at the evaluation position in the window set on the input image is the same or approximate to the value of the edge code at the corresponding evaluation position of the model image. The condition of (2) is a condition for excluding the result calculated for the coordinate that is not the original evaluation position since the position that is not the original evaluation position is sometimes set as the evaluation position in the model holding unit 17, as described later.

With reference to FIG. 18A, the model holding unit 17 stores three parameters "valid/invalid flag", "edge code (EC) value", and "number of delays" for each evaluation position set on the model image. The set values shown in FIG. 18A correspond to the model image shown in FIG. 14.

As shown in FIG. 18B, the "valid/invalid flag" is set with either "0" indicating that the corresponding evaluation position is invalid, or "1" indicating that the corresponding evaluation position is valid. The "EC value" is set with a value (i.e., 0 to 63) in which the value of the edge code at the corresponding evaluation position is quantized to six bits. The "number of delays" is set with a positive integer having the number of steps of the flip-flops 1321-1, 1321-2 to 1321-*k* contained in the delay unit 132 shown in FIG. 15 as a maximum value. FIGS. 18A and 18B illustrate a case in which the delay unit 132 includes the flip-flops 1321 connected in series in eight stages. In other words, the number of stages of the flip-flops 1321 contained in the delay unit 132 becomes the maximum value of the degree of delays that can be set.

When the value of the edge code is quantized to six bits, the corresponding value (angle) of the edge code and the quantized value are in a relationship shown in FIG. 19. In other words, the edge code is "90°" when the quantized edge code value is "15", the edge code is "180°" when the quantized edge code value is "31", and the edge code is "270°" when the quantized edge code value is "47".

The evaluation line L1 will be considered with reference to FIG. 14 again. In the evaluation line L1, assume that the number of delays d1 from the left end of the window WN to the coordinate P2 is "20", and that the number of delays d2 from the coordinate P2 to the coordinate P3 is "16". As described above, the maximum number of delays that can be set with respect to one delay unit 132 is "8" if the flip-flops 1321 configuring the delay unit 132 is eight stages. In this case, the necessary number of delays "20" is realized by using a plurality of delay units 132.

More specifically, the number of delays "8" is set with respect to the delay unit 132 at the most pre-stage (intersection of L1 and X0 in the table of FIG. 18A), the number of delays "8" is also set with respect to the following delay unit 132 of the second stage (intersection of L1 and X1 in the table of FIG. 18A), and the number of delays "4" is set with respect to the following delay unit 132 of the third stage (intersection of L1 and X2 in the table of FIG. 18A). Since the delay units 132 of the first stage and the second stage are not original evaluation positions, the valid/invalid flag of the corresponding parameters is set to "0". Since the delay unit 132 of the third stage is the original evaluation position, the valid/invalid flag of the corresponding parameters is set to "1" and the extracted edge code value is set.

Hereinafter, the parameter representing the characteristics of the model image is similarly registered in the model holding unit 17. The cell with hatching in the table shown in FIG. 18A corresponds to the evaluation position shown in FIG. 14.

(Model Registration Process)

The processing procedure for performing model registration to the model holding unit as shown in FIG. 18A will be described below.

Figure 20:
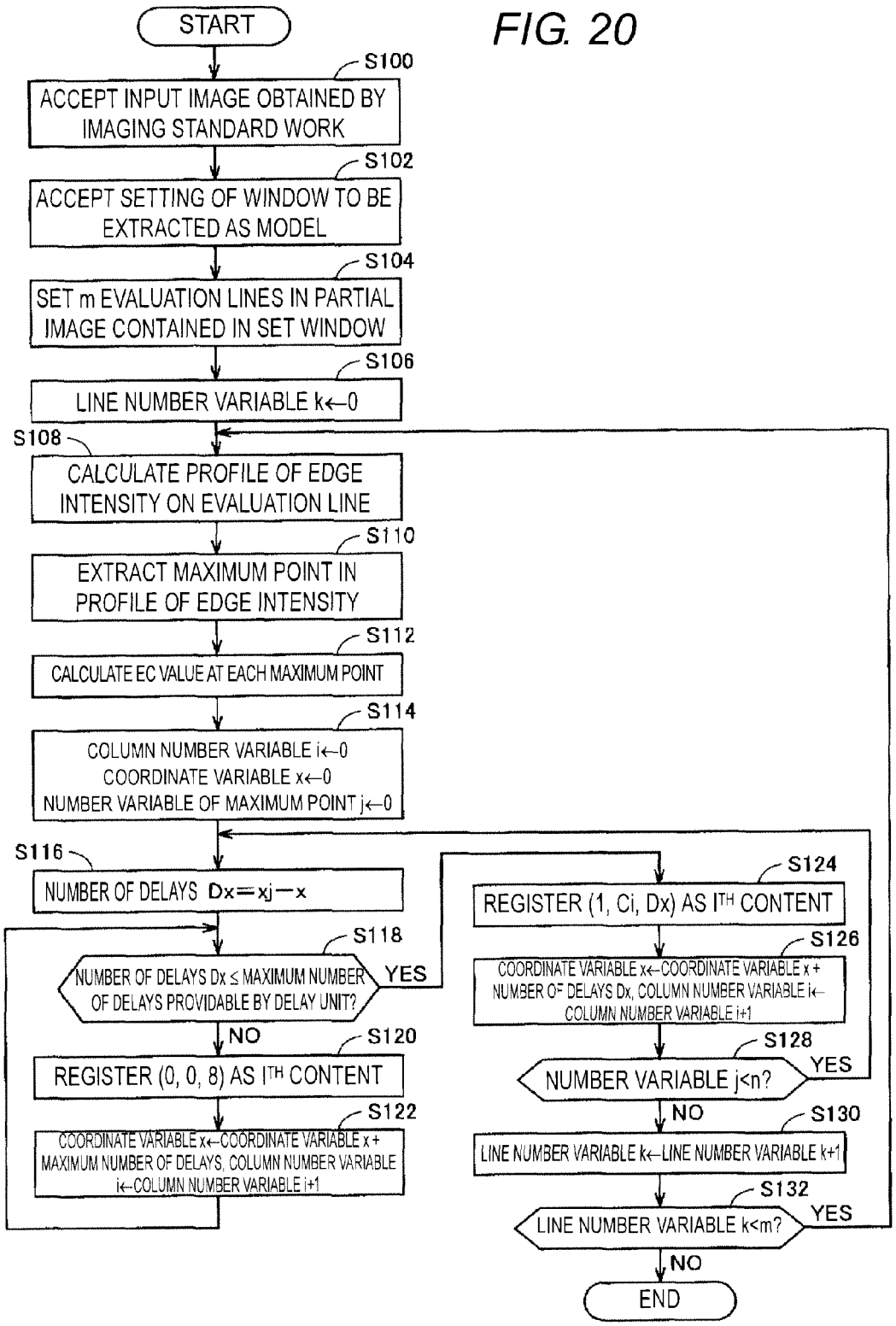
FIG. 20 is a flowchart showing a processing procedure of the model registration according to the embodiment of the present invention.

FIG. 20 is a flowchart showing the processing procedure of the model registration according to the embodiment of the present invention. The processing procedure shown in FIG. 20 is implemented when the CPU 18 shown in FIG. 10 executes the program. Alternatively, the processing procedure may be executed with the image processing device of a different body from the image processing device 100 according to the present embodiment.

With reference to FIG. 20, the CPU 18 accepts the input image obtained by imaging the standard work (step S100). Thereafter, the CPU 18 accepts the setting of the window to be extracted as a model image set on the input image (step S102). Furthermore, the CPU 18 sets m evaluation lines (line numbers 0 to (m−1)) to the partial image contained in the set window (step S104), and initializes the line number variable k (k=0) (step S106).

The CPU 18 calculates the profile of the edge intensity on the evaluation line corresponding to the line number variable k (step S108). In other words, the CPU 18 calculates the edge intensity at the position of each pixel on the evaluation line. Furthermore, the CPU 18 extracts a maximum point in the profile of the calculated edge intensity (step S110), and calculates the edge code value at each maximum point (step S112). Assuming n maximum points are extracted, the coordinate and the edge code value at the respective maximum point are (x0, y0; c0), (x2, y2; c2), . . . , (x(n−1), y(n−1); c(n−1)). The maximum point number is assigned to 0 to (n−1) from the number closest to the origin position on the X-axis.

Subsequently, the CPU 18 initializes the column number variable i of the model image, the coordinate variable x indicating the current position on the X-axis, the number variable j of the extracted maximum point (i=0, x=0, j=0) (step S114). Thereafter, the CPU 18 calculates the number of delays Dx based on the distance difference between the maximum point and the current position on the X-axis (step S116). Specifically, the calculation of number of delays Dx=xj−x is executed. Furthermore, the CPU 18 determines whether or not the number of delays Dx calculated in step S114 is smaller than or equal to the maximum number of delays that can be provided by the delay unit 132 ("8" in the example shown in FIG. 20) (step S118). As described above, the maximum number of delays corresponds to the number of stages of the flip-flops contained in the delay unit 132.

If the number of delays Dx exceeds eight (NO in step S118), the CPU 18 registers (0, 0, 8) as the ith content (step S120). In other words, the CPU 18 registers valid/invalid flag="0", edge code value="0", and number of delays="8". The CPU 18 then adds the maximum number of delays ("8" in this case) to the current coordinate variable x to update to a new coordinate variable x, and adds "1" to the column number variable i to update to a new column number variable i (step S122). The process then returns to step S118.

If the number of delays Dx is smaller than or equal to eight (YES in step S118), the CPU 18 registers (1, ci, Dx) as the ith content (step S124). In other words, the CPU 18 registers valid/invalid flag="1", edge code value="edge code value at ith maximum point", and number of delays="number of delays Dx calculated in step S116". The CPU 18 then adds the maximum number of delays Dx to the current coordinate variable x to update to a new coordinate variable x, adds "1" to the column number variable i to update to a new column number variable i, and adds "1" to the number variable j to update to a new number variable j (step S126). Furthermore, the CPU 18 determines whether or not the number variable j after the update is smaller than n, i.e., the number of extracted maximum points (step S128). If the number variable j is smaller than n (YES in step S128), the process returns to step S116.

If the number variable j is greater than or equal to n (NO in step S128), the CPU 18 adds "1" to the line number variable k to update to a new line number variable k (step S130). Furthermore, the CPU 18 determines whether or not the line number variable k after the update is smaller than m, i.e., the number of set evaluation lines (step S132). If the line number variable k is smaller than m (YES in step S132), the process returns to step S108.

If the line number variable k is greater than or equal to m (NO in step S132), the registration process is terminated.

(Overall Processing Procedure)

Figure 21:
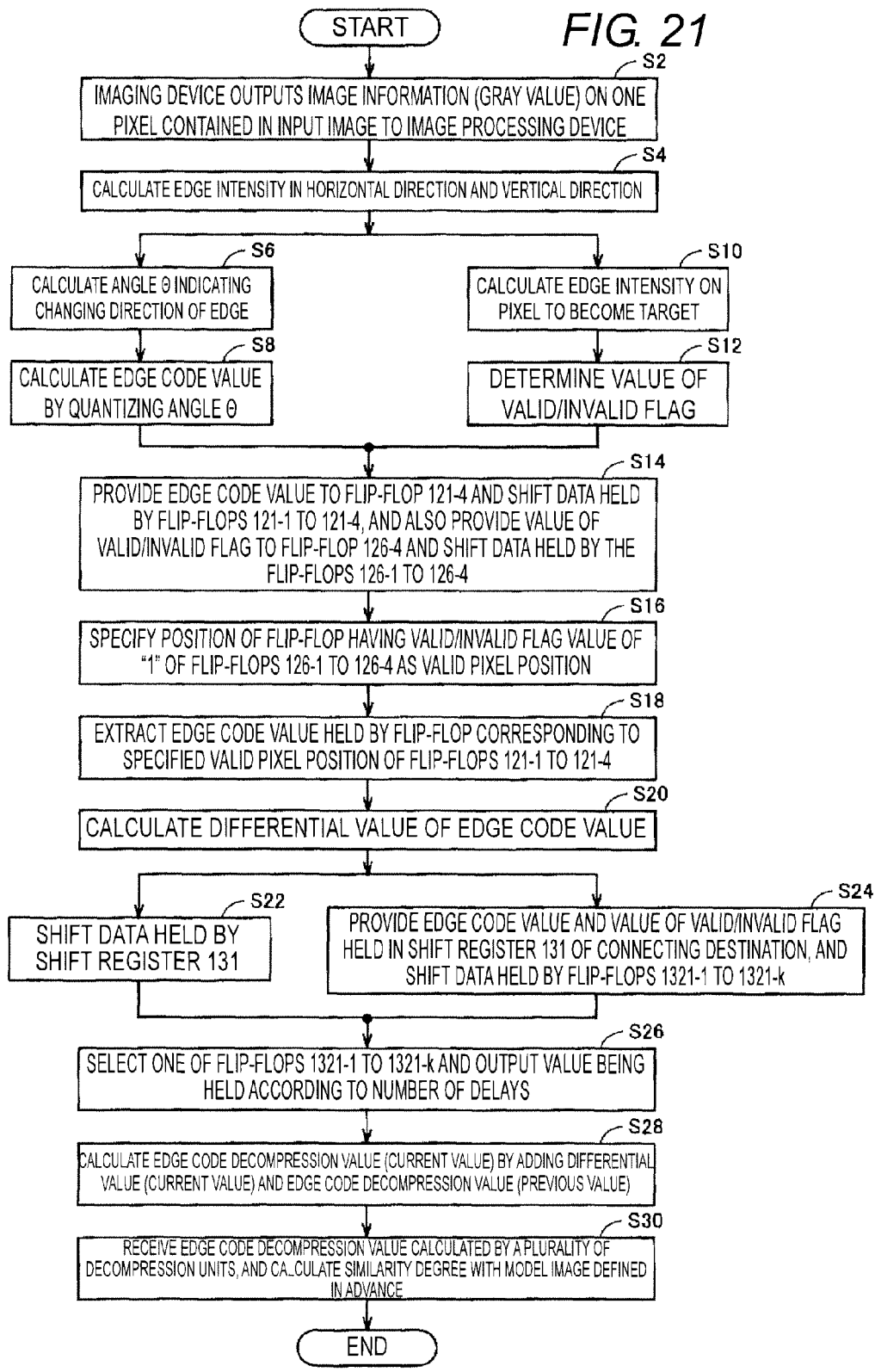
FIG. 21 is a flowchart showing a processing procedure in the pattern matching processing system according to the embodiment of the present invention.

The processing procedure in the image processing device 100 according to the present embodiment is summarized in a flowchart of FIG. 21.

FIG. 21 is a flowchart showing the processing procedure in the pattern matching processing system 1 according to the embodiment of the present invention. The processes shown in FIG. 21 are repeatedly executed at the cycle of the clock signal CL.

With reference to FIG. 21, the imaging device 200 outputs image information (gray value) on one pixel contained in the input image obtained by imaging to the image processing device 100 (step S2).

The horizontal edge intensity detector 111 and the vertical edge intensity detector 112 of the image processing device 100 (FIG. 11) calculate the edge intensity in the horizontal direction and the vertical direction, respectively (step S4). Since the edge intensity needs to be calculated based on the gray value at the target pixel and the surrounding pixels thereof, the process of step S4 is skipped if the surrounding pixels are not inputted.

The EC value calculator 113 of the image processing device 100 (FIG. 11) calculates the angle θ indicating the changing direction of the edge based on the edge intensities in the horizontal direction and the vertical direction calculated in step S4 (step S6). The angle θ calculated by the EC value calculator 113 of the image processing device 100 (FIG. 11) is then quantized to calculate the edge code value (step S8).

In parallel to the processes of step S6 and step S8, the edge intensity calculator 115 of the image processing device 100 (FIG. 11) calculates the edge intensity on the pixel to become the target based on the edge intensities in the horizontal direction and the vertical direction calculated in step S4 (step S10). The threshold value processor 116 of the image processing device 100 (FIG. 11) then compares the calculated edge intensity and the threshold value TH1 to determine the value of the valid/invalid flag (step S12).

The differential image generation circuit 12 provides the edge code value calculated in step S8 to the flip-flop 121-4 (FIG. 12) and shifts the data held by the flip-flops 121-1 to 121-4, and also provides the value of the valid/invalid flag determined in step S12 to the flip-flop 126-4 (FIG. 12) and shifts the data held by the flip-flops 126-1 to 126-4 (step S14). The valid pixel position specifying unit 127 of the differential image generation circuit 12 (FIG. 12) then specifies the position of the flip-flop having the valid/invalid flag value of "1" of the flip-flops 126-1 to 126-4 as a valid pixel position X (step S16). The valid EC value extracting unit 122 of the differential image generation circuit 12 (FIG. 12) extracts the edge code value held by the flip-flop corresponding to the valid pixel position X specified in step S16 of the flip-flops 121-1 to 121-4 (step S18). The difference unit 123 of the differential image generation circuit 12 (FIG. 12) calculates the differential value based on a difference between the edge code value (current value) extracted in step S18 and the edge code value (previous value) extracted in the previous processing cycle (step S20).

The image decompression circuit 13 (FIG. 13) provides the edge code value calculated in step S20 and the value of the valid/invalid flag shifted in step S14 to the shift register 131, and shifts the data held by the shift register 131 (step S22).

In parallel to the process of step S22, each delay unit 132 provides the edge code value and the value of the valid/invalid flag held after being shifted in the shift register 131 of the connecting destination to the flip-flop 1321-1 (FIG. 15), and shifts the data held by the flip-flops 1321-1 to 1321-$k$ (step S24). The selector 1322 of each delay unit 132 selects one of the flip-flops 1321-1 to 1321-$k$ and outputs the value being held according to the corresponding number of delays stored in the model holding unit 17 (step S26).

Each decompression unit 133 of the image decompression circuit 13 (FIG. 16) adds the differential value (current value) outputted from the selector 1322 of the corresponding delay unit 132 in step S26, and the edge code decompression value (previous value) calculated in the previous processing cycle, and calculates the edge code decompression value (current value) (step S28).

The difference calculation circuit 14 receives the edge code decompression value calculated by a plurality of decompression units 133 of the image decompression circuit 13 in step S28, calculates the similarity degree with the model image defined in advance, and outputs to the peak hold circuit 15 (FIG. 10) (step S30). The process in the current clock cycle is then terminated.

When the next clock cycle arrives, the processes after step S2 are again executed.

(Effects)

According to the embodiment of the present invention, the edge code image generated based on the gray value of the input image is sequentially stored in the line buffer after being compressed, and thus the necessary storage region can be reduced compared to a case where the edge code image is stored as is in the line buffer. The pattern matching based on the edge code thus can be implemented with a smaller circuit configuration.

According to the embodiment of the present invention, compression is carried out using the increase/decrease information (i.e., differential value) of the edge code value between the adjacent elements in the edge code image, and thus decompression to the edge code value can be carried out by simply integrating the differential value in time-series. In other words, decompression to the edge code image can be carried out within one clock cycle. Thus, the circuit configuration for decompressing the compressed edge code image can be simplified, and the decompression process can be carried out in a short time. As a result, the real time processing in which the pattern matching process completes at a time substantially similar to the time required to acquire one input image can be realized.

(Variant)

In the embodiment described above, a configuration of decompressing the differential image to the edge code image and performing the pattern matching process with the model has been illustrated, but a model image corresponding to the differential image may be registered in advance, and the pattern matching process may be performed with the input image compressed to a differential image.

In the embodiment described above, a data structure in which each element of the edge code image independently includes the edge code value and the valid/invalid flag has been illustrated, but a data structure of an integrated form may be adopted. For example, data of seven bits may be assigned to each element of the edge code image, a range the data of seven bits may take may be set, for example, to a range of (−1 to 126), and invalid may be indicated when "−1".

The embodiments disclosed herein are illustrative in all aspects and should not be construed as being exclusive. The scope of the invention is defined by the claims rather than by the description made above, and all modifications equivalent in meaning with the claims and within the scope of the claims are to be encompassed therein.

What is claimed is:

1. An image processing device comprising:
    a generation unit configured to generate an edge code image based on a gray value of an input image, each element contained in the edge code image including an edge code value and information indicating valid/invalid of the edge code value;
    a compression unit configured to compress the edge code image by assigning information representing the edge code value for an element having a valid edge code value to an element having an invalid edge code value;
    a storage unit configured to sequentially store the compressed edge code image;
    a decompression unit configured to decompress the compressed edge code image stored in the storage unit; and
    a comparator configured to calculate a similarity degree between the edge code image decompressed by the decompression unit and a model image defined in advance,
    wherein the compression unit is configured to hold the edge code value generated at every predetermined cycle by the generation unit and the information indicating valid/invalid of the edge code value for a plurality of processing cycles, and output a differential value based on a difference between the edge code value corresponding to the information indicating valid in a previous processing cycle and the edge code value corresponding to the information indicating valid in a current processing cycle as increase/decrease information included in the compressed edge code image.

2. The image processing device according to claim 1, wherein
    the generation unit is inputted with the gray value of each pixel contained in the input image in a predetermined order;
    the generation unit is configured to sequentially generate the edge code value for every input of the gray value; and
    the compression unit is configured to output information for specifying the valid edge code value in correspondence to an element, which is generated before an element having a valid edge code value and which has an invalid edge code value.

3. The image processing device according to claim 1, wherein
    when a first zone in which the valid edge code value continues, a second zone, following the first zone, in which the invalid edge code value continues, and a third zone, following the second zone, in which the valid edge code value continues appear in a profile of the sequentially outputted edge code value, the compression unit is configured to output increase/decrease information from the edge code value contained in the first zone to the edge code value contained in the third zone in correspondence with an element corresponding to the second zone.

4. The image processing device according to claim 1, wherein
    the compression unit includes,
        a plurality of first delay elements, connected in series, sequentially inputted with the edge code values generated by the generation unit at a predetermined cycle,
        a plurality of second delay elements, connected in series, sequentially inputted with the information indicating valid/invalid of the edge code value generated by the generation unit at the predetermined cycle, a position specifying unit configured to specify a position of the second delay element storing information indicating valid of the information indicating valid/invalid of the edge code value held in the plurality of second delay elements, an extracting unit configured to extract the edge code value held in the first delay element corresponding to the position specified by the position specifying unit of the edge code values held in the plurality of first delay elements, and a difference calculation unit configured to sequentially output a difference between the edge code value extracted by the extracting unit in a previous cycle and the edge code value extracted by the extracting unit in a current cycle as the increase/decrease information.

5. The image processing device according to claim 4, wherein the decompression unit includes an integrating portion configured to integrate the sequentially outputted increase/decrease information.

6. The image processing device according to claim 5, wherein the decompression unit includes, a plurality of third delay elements, connected in series, sequentially inputted with the edge code value held at a predetermined position of the storage unit at the predetermined cycle, and a selection unit configured to output, to the integrating portion, the edge code value held in the delay element corresponding to relative positional information contained in the model image of the plurality of third delay elements.

7. The image processing device according to claim 6, wherein the model image includes an edge code value at an evaluation position for calculating the similarity degree, and the relative positional information indicating a difference in a relative position between the evaluation position and another evaluation position.

8. The image processing device according to claim 1, wherein the generation unit includes, a detector configured to detect an edge intensity at each pixel of the input image; and a determination unit configured to output information indicating that the corresponding edge code value is valid when the edge intensity detected by the detector exceeds a predetermined value.

9. An image processing method comprising the steps of:

generating an edge code image based on a gray value of an input image, each element contained in the edge code image including an edge code value and information indicating valid/invalid of the edge code value;

compressing the edge code image by assigning information representing the edge code value for an element having a valid edge code value to an element having an invalid edge code value;

sequentially storing the compressed edge code image;

decompressing the stored compressed edge code image; and calculating a similarity degree between the decompressed edge code image and a model image defined in advance, wherein the step of compressing the edge code image includes steps of holding the edge code value generated at every predetermined cycle by the generation unit and the information indicating valid/invalid of the edge code value for a plurality of processing cycles, and outputting a differential value based on a difference between the edge code value corresponding to the information indicating valid in a previous processing cycle and the edge code value corresponding to the information indicating valid in a current processing cycle as increase/decrease information included in the compressed edge code image.

* * * * *